(12) United States Patent
Shirai

(10) Patent No.: US 11,178,456 B2
(45) Date of Patent: Nov. 16, 2021

(54) VIDEO DISTRIBUTION SYSTEM, VIDEO DISTRIBUTION METHOD, AND STORAGE MEDIUM STORING VIDEO DISTRIBUTION PROGRAM

(71) Applicant: GREE, Inc., Tokyo (JP)

(72) Inventor: Akihiko Shirai, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/545,022

(22) Filed: Aug. 20, 2019

(65) Prior Publication Data

US 2020/0077148 A1 Mar. 5, 2020

(30) Foreign Application Priority Data

Sep. 3, 2018 (JP) .............................. JP2018-164520

(51) Int. Cl.
| | |
|---|---|
| *H04N 21/236* | (2011.01) |
| *H04N 21/242* | (2011.01) |
| *H04N 21/25* | (2011.01) |
| *H04N 21/422* | (2011.01) |
| *H04N 21/43* | (2011.01) |
| *H04N 21/442* | (2011.01) |
| *H04N 21/466* | (2011.01) |

(Continued)

(52) U.S. Cl.
CPC ... *H04N 21/4532* (2013.01); *H04N 21/44222* (2013.01); *H04N 21/47* (2013.01); *H04N 21/482* (2013.01); *H04N 21/84* (2013.01)

(58) Field of Classification Search
None
See application file for complete search history.

(56) References Cited

U.S. PATENT DOCUMENTS

2013/0014139 A1 1/2013 Kawakami et al.
2013/0204707 A1* 8/2013 Ptucha ............... G06Q 30/0271
705/14.66

(Continued)

FOREIGN PATENT DOCUMENTS

JP 2010-066790 A 3/2010
JP 2012-120098 A 6/2012

(Continued)

OTHER PUBLICATIONS

Decision for Refusal dated May 19, 2020, issued in corresponding Japanese Patent Application No. 2018-164520 with English translation.

(Continued)

*Primary Examiner* — Brian T Pendleton
*Assistant Examiner* — Jean D Saint Cyr
(74) *Attorney, Agent, or Firm* — Pillsbury Winthrop Shaw Pittman, LLP

(57) ABSTRACT

A video distribution system in one embodiment includes one or more computer processors. The one or more computer processors execute computer-readable instructions to distribute a video that includes an animation of a character object generated based on actor's behavior to a viewing user, and store actor information representing the actor's behavior and nonverbal feedback information representing nonverbal feedback about the video from the viewing user in association with a time code of the video. The nonverbal feedback information is detected by one or more user devices.

18 Claims, 10 Drawing Sheets

(51) Int. Cl.
*H04N 21/475* (2011.01)
*H04N 21/45* (2011.01)
*H04N 21/84* (2011.01)
*H04N 21/482* (2011.01)
*H04N 21/47* (2011.01)

(56) References Cited

U.S. PATENT DOCUMENTS

| | | | | |
|---|---|---|---|---|
| 2014/0337126 A1* | 11/2014 | Ohanyan | ............ | G06Q 30/0251 |
| | | | | 705/14.49 |
| 2015/0161628 A1* | 6/2015 | Weinsberg | ......... | G06Q 30/0202 |
| | | | | 705/7.31 |
| 2015/0379606 A1* | 12/2015 | Vaidyanathan | .... | G06Q 30/0633 |
| | | | | 705/26.62 |
| 2017/0317964 A1* | 11/2017 | Chen | ...................... | H04L 67/306 |
| 2018/0020963 A1* | 1/2018 | Friant | .................. | A61B 5/6801 |
| | | | | 705/14.66 |
| 2018/0268305 A1* | 9/2018 | Dhondse | ................ | G06Q 40/08 |
| 2018/0293312 A1* | 10/2018 | Tateossian | ............ | G06F 16/735 |
| 2019/0102929 A1* | 4/2019 | Davis | .................. | G06F 21/6209 |

FOREIGN PATENT DOCUMENTS

| | | |
|---|---|---|
| JP | 2013-21466 A | 1/2013 |
| JP | 2015-031996 A | 2/2015 |

OTHER PUBLICATIONS

Yusuke Hasegawa, Beginning of New Ear of Virtual Idle Project Mari A, CG World, Japan, Born Digital Inc., Nov. 10, 2017, 231, pp. 74-79.

Non-Final Office Action dated Nov. 19, 2019 issued in corresponding Japanese Patent Application No. 2018-164520 with English translation.

* cited by examiner

| Viewing User Account | Frame Position | Verbal Feedback Information |
|---|---|---|
| User ID | Time Code | Text Data |

Fig. 3

| Viewing User Account | Frame Position | Nonverbal Feedback Information |
|---|---|---|
| User ID | Time Code | Acceleration, Viewing Information, Biological Information, Emotion Information |

Fig. 4

| Viewing User Account | Frame Position | Evaluation Information |
|---|---|---|
| User ID | Time Code | Like, Dislike, Rating Information |

Fig. 5

| Viewing User Account | Frame Position | Gift Information |
|---|---|---|
| User ID | Time Code | Number of Times Gifting Performed<br>Amount of Money Spent for Gifts |

Fig. 6

| Frame Position | Actor Information |
|---|---|
| Time Code | Acceleration, Voice Data (Volume), Face Input Data |

Fig. 7

VIDEO DISTRIBUTION SYSTEM, VIDEO DISTRIBUTION METHOD, AND STORAGE MEDIUM STORING VIDEO DISTRIBUTION PROGRAM

TECHNICAL FIELD

The present disclosure relates to a video distribution system, a video distribution method, and a storage medium storing a video distribution program, for distributing a video containing animation of a character object generated based on actor's behavior. More specifically, the disclosure relates to a video distribution system, a video distribution method, and a storage medium storing a video distribution program in which it is possible to provide useful feedback to a video creator such as an actor.

BACKGROUND

Video distribution systems that produce an animation of a character object based on actor's behavior and distribute a video containing the animation have been known. Such a video distribution system is disclosed in, for example, non-patent publication stated below. The non-patent publication 1 describes a video distribution system that generates an animation of a virtual idle based on motion capture data representing motions of an actor and live-distributes a video containing the animation.

A typical video distribution system accepts comments on a distributed video from viewing users in order to enhance the interactivity. In the video distribution system described in the non-patent publication 1, a comment in text format is received from a viewing user, and the received comment is displayed superimposed on the live-distributed video.

RELEVANT REFERENCES

List of Relevant Non-Patent Literature

Non-patent Publication 1: "Hasegawa Yusuke, Beginning of New Ear of Virtual Idle PROJECT Mari A, CG WORLD, Japan, Born Digital Inc., Nov. 10, 2017, 231, pp. 74-79.

SUMMARY

In the conventional video distribution system, by displaying comments from viewing users such that the comments are superimposed on the screen, it is possible to know how much chat conversations among the viewing users become active and lively. For example, when the viewing users lively chat, many comments superimposed on the video are displayed. By recording the video with the comments superimposed and grasping whether less or many comments are displayed through the running time of the video distribution, the video creator is able to know some extent whether the viewing users enjoy or show interests in his/her video based on the number of comments from them.

In conventional video systems, comments are inputted in text, and such text input requires input operations so that there is a gap between the time at which a viewing user intends to make a comment in the distributed video and the time at which the posted comment is displayed on the video. For this reason, the video creator may not be able to easily tell which behavior of the actor attracted the attention of the viewing users.

In the conventional video distribution system, a comment from a viewing user is entered by text input. Since the content of a comment does not necessarily correspond to the emotion or affect which the viewing user actually has, it is difficult to infer the emotion or affect of the viewing user based on feedback information entered in text by the viewing user. Further, in the conventional video distribution system, even when feedback from viewing users with respect to continuously distributed video frames are recorded in time series, it is difficult to extract the range of the video frames where was significant for the viewing users (that is, the video frames that caused a change of the viewing user's emotion).

As discussed above, in the video distribution system that distributes a video containing an animation of a character object generated based on behavior of an actor, there is a drawback that it is difficult to obtain useful feedback about the performance of the actor from viewing users.

It is an object of the present invention to provide a technical improvement which solves or alleviates at least part of the drawback of the prior art mentioned above. More specifically, one object of the invention is to provide a video distribution system in which useful feedback about the actor's behavior from viewing users can be easily obtained.

Other objects of the disclosure will be apparent with reference to the entire description in this specification. The invention disclosed in the specification may solve any other problem grasped from the following description of embodiments of the invention instead of or in addition to the above drawback.

A video distribution system according to one aspect of the invention includes one or more computer processors. The one or more computer processors execute computer-readable instructions to distribute a video that includes an animation of a character object generated based on actor's behavior to a viewing user, and store actor information representing the actor's behavior and nonverbal feedback information representing nonverbal feedback about the video from the viewing user in association with a time code of the video. The nonverbal feedback information is detected by one or more user devices.

In the video distribution system, the nonverbal feedback information may include acceleration of the one or more user devices held by the viewing user.

In the video distribution system, the nonverbal feedback information may include biological information of the viewing user.

In the video distribution system, the nonverbal feedback information may include emotion information representing an emotion of the viewing user.

In the video distribution system, the one or more computer processors may store the verbal feedback information representing verbal feedback from the viewing user is further stored in association with the time code of the video.

In the video distribution system, the verbal feedback may be determined based on text input or speech input.

In the video distribution system, the one or more computer processors may store evaluation information representing an evaluation made by the viewing user in association with the time code of the video.

In the video distribution system, the one or more computer processors may store at least one of gift purchase information representing the number of gifts purchased or the amount of money spent for gifts by the viewing user and gifting information related to a gift provided from the viewing user to the actor in association with the time code of the video.

In the video distribution system, the one or more computer processors may display the actor information and the nonverbal feedback information in time series based on the time code.

In the video distribution system, the actor information and the nonverbal feedback information may be displayed on a display disposed at a position where the actor is able to see the display.

In the video distribution system, the one or more computer processors may generate a digest video of the video based on the nonverbal feedback information.

In the video distribution system, the one or more computer processors may recommend another actor different from the actor to the viewing user based on the actor information and the nonverbal feedback information.

A video distribution system according to another aspect of the invention includes one or more computer processors. The one or more computer processors execute computer-readable instructions to distribute a video that includes an animation of a character object generated based on actor's behavior, and change appearance of the character object based on feedback information from a viewing user who views the video.

A video distribution system according to yet another aspect of the invention includes one or more computer processors. The one or more computer processors execute computer-readable instructions to distribute a video that includes an animation of a character object generated based on actor's behavior, and generate a driving signal for driving an actor device used by the actor based on feedback information from a viewing user who views the video.

In the video distribution system, the actuator may be configured to vibrate in response to reception of the driving signal.

According to another aspect of the invention, provided is a method of distributing a video performed by executing computer readable instructions by one or more computer processor. The method includes distributing a video that includes an animation of a character object generated based on actor's behavior to a viewing user, and storing actor information representing the actor's behavior and nonverbal feedback information representing nonverbal feedback about the video from the viewing user in association with a time code of the video. The nonverbal feedback information is detected by one or more user devices.

According to still yet another aspect of the invention, provided is a computer-readable tangible non-transitory storage medium that includes a program executed by one or more computer processors. The program causes the one or more computer processors to: distribute a video that includes an animation of a character object generated based on actor's behavior to a viewing user, and store actor information representing the actor's behavior and nonverbal feedback information representing nonverbal feedback about the video from the viewing user in association with a time code of the video, the nonverbal feedback information being detected by one or more user devices.

According to the aspects of the invention, provided is a video distribution system in which useful feedback about actor's behavior from viewing users can be obtained.

BRIEF DESCRIPTION OF THE DRAWINGS

FIG. 3 illustrates verbal feedback information stored in the video distribution system of FIG. 1.

FIG. 4 illustrates nonverbal feedback information stored in the video distribution system of FIG. 1.

FIG. 5 illustrates evaluation information stored in the video distribution system of FIG. 1.

FIG. 6 illustrates gift information stored in the video distribution system of FIG. 1.

FIG. 7 illustrates actor information stored in the video distribution system of FIG. 1.

DESCRIPTION OF THE EMBODIMENTS

Figure 1:
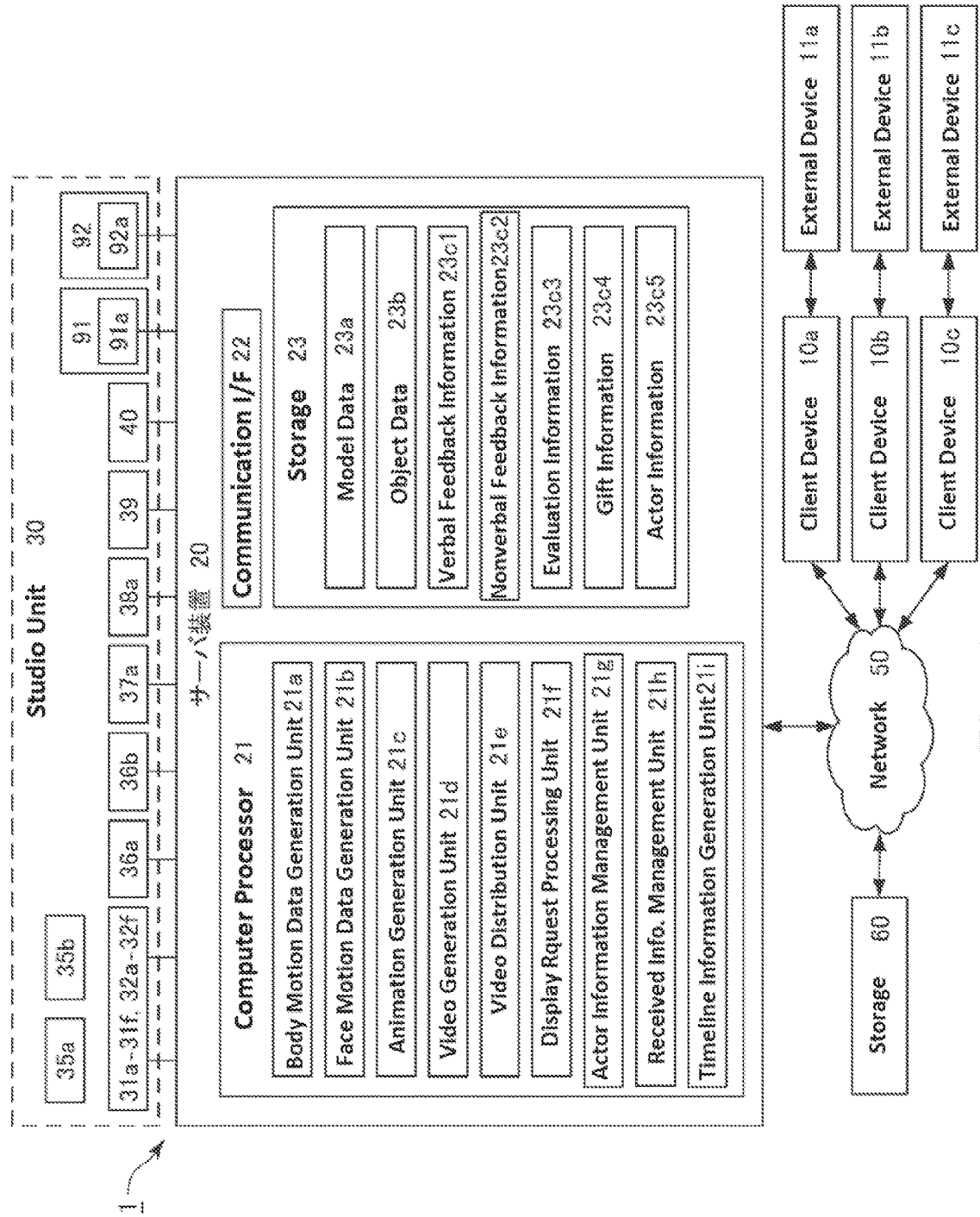
FIG. 1 is a block diagram illustrating a video distribution system in one embodiment.

Various embodiments of the disclosure will be described hereinafter with reference to the accompanying drawings. Throughout the drawings, the same or similar elements are denoted by the same reference numerals.

Figure 2:
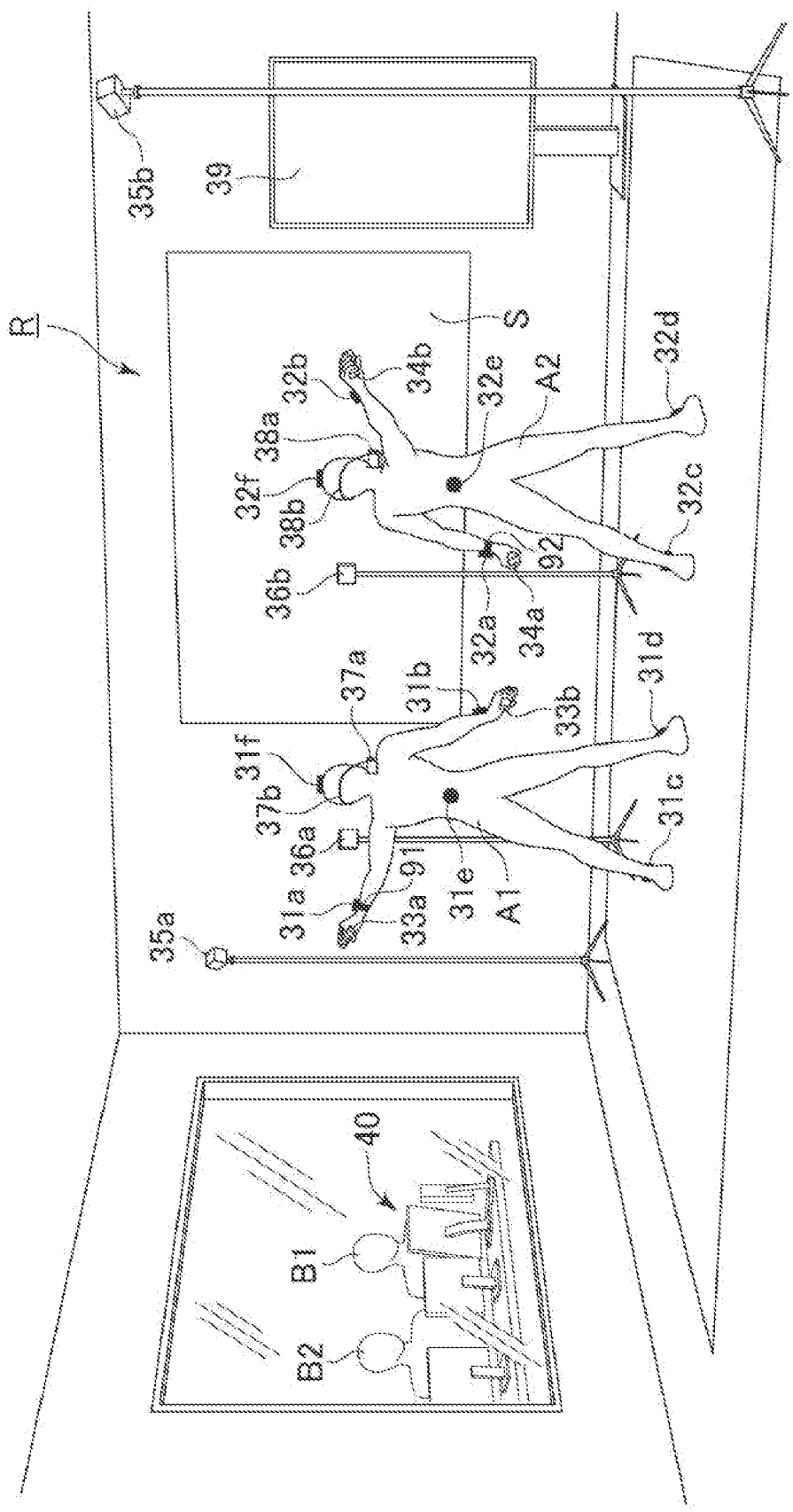
FIG. 2 schematically illustrates an installation of a studio where production of a video distributed in the video distribution system of FIG. 1 is performed.

With reference to FIGS. 1 to 7, a video distribution system according to an embodiment will be described. FIG. 1 is a block diagram illustrating a video distribution system 1 according to the embodiment, FIG. 2 schematically illustrates an installation of a studio where a video distributed in the video distribution system 1 is produced, and FIGS. 3 to 7 are for describing nonverbal feedback information, verbal feedback information, evaluation information, gift information, and actor information respectively stored in the video distribution system 1.

The video distribution system 1 includes client devices 10a to 10c, external devices 11a to 11c, a server device 20, a studio unit 30, and a storage 60. The client devices 10a to 10c, the server device 20, and the storage 60 are communicably interconnected over a network 50. The server device 20 is configured to distribute a video stream including an animation of a character, as described later. The character included in the video may be motion-controlled in a virtual space. This video stream is attached with a time code for reproduction synchronization performed on the video receiving side. The time code is represented by, for example, a clock count value. The time code is embedded in the video stream at a predetermined time interval (for example, every 100 ms) in order to maintain synchronization. The time code used for the reproduction synchronization is called a time stamp in MPEG-2 standard. In this specification, a video stream distributed from the server device 20 may be simply referred to as a video.

The client devices 10a to 10c will be now described. The client devices 10a to 10c are configured to receive a video distributed from the server device 20 and to reproduce the received video. A first viewing user who is a user of the client device 10a, a second viewing user who is a user of the client device 10b, and a third viewing user who is a user of the client device 10c are able to view the distributed video with their respective client devices. The video distribution system 1 may include less than three client devices, or may include more than three client devices. In the specification, the first viewing user, the second viewing user, and the third viewing user may be collectively referred to as viewing users.

The client devices 10a to 10c are information processing devices such as smartphones. In addition to the smartphone, the client devices 10a to 10c each may be a mobile phone, a tablet, a personal computer, an electronic book reader, a wearable computer, a game console, a head mounted display, or any other information processing devices that are capable of playing videos. Each of the client devices 10a to 10c may include a computer processor, a memory unit, a communication I/F, a display, a sensor unit including various sensors such as a gyro sensor, a sound collecting device such as a microphone, and a storage for storing various information.

The display 10 of each client devices 10a to 10c includes a display panel and a touch-screen panel. The touch-screen panel is configured to detect touch interactions (touch operations) performed by a user. The touch-screen panel is capable of detecting various touch operations such as tapping, double tapping, and dragging performed by the user. The touch-screen panel may include a capacitive proximity sensor and may be capable of detecting a non-contact operation performed by the user.

Each of the client devices 10a to 10c may include one or more sensor units. The sensor unit includes at least one selected from the group consisting of an acceleration sensor, a gyro sensor, and a geomagnetic sensor. The sensor unit may include an eye tracking sensor that directly detects eye movements of the user of the corresponding client device 10a to 10c. The eye tracking sensor is, for example, an eye-gaze tracking sensor that emits a near-infrared light beam into the iris of a user and detects its reflected light.

Each of the client devices 10a to 10c is capable of receiving, from the viewing users, input of various feedback information about the video that viewing users are watching. The feedback information from the viewing users includes verbal feedback information and nonverbal feedback information.

The verbal feedback information is feedback information expressed in language from viewing users. The client devices 10a to 10c can obtain the verbal feedback information through the verbal input by the viewing users. The verbal input is, for example, text input or speech input. Text input is performed through a keyboard, a touch screen, or any other input interface that allows text input provided in the client devices 10a to 10c, and the inputted text is accepted by the client devices 10a to 10c. The speech input is accepted when detecting a language spoken in a voice through a sound collecting device such as a microphone provided in the client devices 10a to 10c. The client devices 10a to 10c are configured to store text information corresponding to the contents of verbal input as the verbal feedback information. For example, while viewing users are watching a video, the viewing users operate their client devices 10a to 10c to input comments in text regarding the video or an actor's performance. The comments inputted in text are stored in the respective client devices 10a to 10c as text information.

The verbal feedback information accepted through the verbal input may be stored in the corresponding client devices 10a to 10c in association with a time code of the video at the time when the verbal input was accepted by the corresponding client devices 10a to 10c. For example, by using the abs-send-time in Real-time Transport Protocol (RTP) extension in WebRTC (Web Real-Time Communication), the absolute time considering a delay is obtained for each client devices 10a to 10c, and the verbal feedback information accepted through the verbal input can be stored in association with the time code of the video.

As described above, the verbal input is performed by either the text input or the speech input. Thus it takes a certain amount of time until the verbal input is completed after a viewing user decided to provide his/her feedback. Therefore a time gap is created between the time when the viewing user intends to provide feedback and the time when the verbal input is accepted.

The nonverbal feedback information is feedback information inputted through means other than language from viewing users. The client devices 10a to 10c are capable of acquiring nonverbal feedback information through nonverbal input from a viewing user detected by an acceleration sensor, a camera, a biological information sensor, or any other detection device. Nonverbal feedback information includes, for example, acceleration detected by an acceleration sensor, viewing information indicating whether or not a viewing user is viewing the video based on image information of the viewing user captured by a camera, viewing user's biological information detected by a biological information sensor, and any other nonverbal information about the viewing user. The nonverbal feedback information may include emotion information indicating an emotion of the viewing user estimated based on nonverbal input detected by an acceleration sensor, a camera, a biological information sensor, and any other detection device.

As the nonverbal feedback information, an acceleration detected by the acceleration sensor itself or emotion information indicating an emotion of the viewing user estimated from the acceleration may be used. It has been reported that emotions of a viewing user can be estimated based on a high-frequency component of an acceleration of the device held by the viewing user while watching a video. For example, "Real-time behavior analysis when viewing entertainment contents on a smartphone using WebSocket" (Entertainment Computing Symposium (EC2013), October 2013) describes that accelerations in the three-axis directions are detected by an acceleration sensor embedded in a smartphone held by a viewing user. Square-root of sum of squares of the three-axis accelerations is calculated. When the calculated square-root of sum of squares is equal to or greater than a predetermined value (for example, 0.2 [G] or 0.1 [G]), it is estimated that the viewing user is laughing. In this way, the emotion information indicating whether the viewing user is laughing can be generated based on the high-frequency component of the acceleration detected by the acceleration sensor.

It is possible to determine whether a viewing user is viewing the video based on an orientation of the viewing user's face. For example, as described in Japanese Patent Application Publication No. 2013-109537, an orientation of the face of a viewing user is estimated based on an image of the viewing user's face captured by a camera, and whether the viewing user is viewing the video displayed can be determined based on whether the viewing user's face is oriented toward a reproduction device (for example, the client device 10a to 10c) on which the video is reproduced and displayed. The client devices 10a to 10c are each able to generate the viewing information indicating whether the viewing user is viewing the video depending on the determination result.

It is also possible to infer emotions of a viewing user from an image of the viewing user's face captured by a camera. For example, Japanese Patent Application Publication No. H3-252775 discloses a technique for estimating an emotion of a viewing user in which a facial expression most matching to the image of the viewing user's face captured by a camera is searched from among facial expression patterns stored in association with emotions (joy, anger, sadness, fun). The client devices 10a to 10c are each able to generate the emotion information of the viewing user based on the estimation result.

A technique for generating the emotion information representing emotions of the viewing user based on the biological information of the viewing user is well known as described in, for example, "Biometrics considering human emotions . . . Informatics Workshop 2004, September 2004." The client devices 10a to 10c are each able to generate the emotion information representing an emotion of the viewing user using such a technique.

Emotion information is information representing human emotions such as fun, sadness, anger, surprise, fear and the like. Since it is not easy to control user's emotion by his/her intention, a natural (unconscious or involuntary) reaction of the viewing user to the video is more likely to be reflected to the emotion information of the viewing user than the verbal feedback information. The emotion information can be acquired from the verbal feedback information and/or the nonverbal feedback information. For example, a part of information, for example, "fun" can be expressed by language. However, since it is assumed that viewing users use various languages and have various cultural backgrounds. Therefore, when the emotion information is expressed in languages, there is a possibility that significant feedback from the viewing users cannot be obtained. For this reason, it is preferable to acquire the emotion information as nonverbal feedback information instead of the verbal feedback information.

The client devices 10a to 10c may each detect nonverbal input through a built-in sensor, or may acquire nonverbal input detected by an external device (for example, external devices 11a to 11c described later) from the external device.

The nonverbal feedback information may be generated at a predetermined sampling rate. For example, acceleration and biological information are generated at a predetermined sampling rate.

The viewing user's biological information detected by a biological information sensor includes body temperature, respiratory rate, pulse, eye movement, blood oxygen concentration, myoelectric potential (electric potential generated in muscle), and any other detectable information about the living body. The biological information sensor is any known sensor that is capable of detecting such biological information.

The nonverbal feedback information accepted through the nonverbal input may be stored in the corresponding client devices 10a to 10c in association with a time code of the video at the time when the nonverbal input was accepted by the corresponding client devices 10a to 10c. Since a detection device such as a sensor detects nonverbal input, the nonverbal input is detected immediately after the occurrence of a biological reaction (for example, voluntary movement or involuntary movement of the viewing user, fluctuation of biological information) based on which the nonverbal input is performed. That is, the time when the biological reaction based on which the nonverbal input is performed occurs is close to the time at which the nonverbal input is completed.

The client devices 10a to 10c are each capable of receiving operation input from a viewing user. The operation input is associated with specific processing of the client devices 10a to 10c. The operation input is accepted through an operation on a physical or virtual operation element of each client devices 10a to 10c. More specifically, the operation input may be accepted through an operation of pressing a physical button provided in the corresponding client devices 10a to 10c or an operation of tapping an operation icon displayed on the display screen of the client devices 10a to 10c by the viewing user. Alternatively the operation input may be input by performing a predetermined gesture by the viewing user. For example, a specific posture or movement of the viewing user is associated with a specific action of the client devices 10a to 10c in advance, and when the viewing user takes the specific posture or the specific movement, the client devices 10a to 10c accept the gesture input.

After the client devices 10a to 10c accept the operation input, the client devices 10a to 10c perform the process corresponding to the accepted operation. The process performed by the client devices 10a to 10c may include various processes. For example, the client devices 10a to 10c may select a video, start reproduction of the video, and stop reproduction of the video according to the accepted operation input. In addition to the process described above, the client devices 10a to 10c may perform a gift purchase process to purchase a gift in the video that the viewing user is viewing, a gifting processing to provide a gift to an performing actor for the video that the viewing user is viewing, an evaluation process to evaluate the video that the viewing user is viewing, and any other various processes.

Gift purchase information related to the gift purchase process and gifting information related to the gifting process may be stored in the client devices 10a to 10c in association with a time code of the video when the operation input for performing the gift purchase process is accepted by the client devices 10a to 10c. The gift purchase information is information representing, for example, the number of gifts purchased and/or the amount of money spent for the gift(s) in the gift purchase process. The gifting information is information representing, for example, the number or amount of gifts provided to an actor from a viewing user and/or the amount of money spent for purchase of the gifts provided to the actor. The gift purchase information and gifting information may be herein collectively referred to as gift information.

Evaluation information related to the evaluation process may be stored in the client devices 10a to 10c in association with a time code of the video when the operation input for perform the evaluation process is accepted by the client apparatuses 10a to 10c. The evaluation information is information representing evaluations by viewing users who are viewing the video. For example, a viewing user is able to tap and select an evaluation button displayed on the display screen including the video while watching the video, in order to give a positive evaluation ("like") or negative evaluation ("dislike") of the video. On the evaluation buttons, for example, characters such as "Like" and "Love," a symbol such as a heart, or a graphic representing a smiley face may be shown to let the viewing user know that he/she is able to give the positive evaluation by selecting the evaluation buttons. The evaluation information may be, for example, information representing the number of times that a positive evaluation or a negative evaluation is made by viewing users. The evaluation information may be rating information. The evaluation information may be information representing the evaluation by a viewing user for the video which the viewing user is viewing in association with an emotion of the viewing user. For example, an emotion select button for allowing a viewing user to select an emotion may be displayed on the display screen including the video. By selecting the emotion select button, the viewing user is able to select his/her emotion such that he/she was impressed with the video, that he/she was not able to sympathize with the video, or any other emotions of the viewing user. For example, the emotion select buttons include an applause button for showing a feeling of being impressed by the video, a question mark button for showing an feeling that the video was unsympathetic for the viewing user, a surprise button for showing a feeling of being surprised at the video, and the like. Each of the emotion selection buttons may include a display of a symbol or graphics representing an emotion to be selected by selecting the emotion select button. For example, the applause button may include a graphic representation of clapping hands, the question mark button may include a question mark, and the surprise button may include an exclamation mark.

The external devices 11a to 11c will be now described. The external devices 11a to 11c are configured to be capable of acquiring the above nonverbal feedback information. Each of the external devices 11a to 11c may be a device such as an acceleration sensor, a motion sensor, a camera that captures a viewing user and generates imaging data, a biological information sensor that detects biological information, and any other device that is capable of detecting the nonverbal information regarding the viewing user.

The external devices 11a to 11c may be for example, Kinect (trademark) provided by Microsoft Corporation, wii (trademark) provided by Nintendo Co., Ltd., Oculus Touch provided by Oculus VR, Inc, a controller of HTC Vive provided by HTC CORPORATION, psyllium provided by Yamato Industrial Co., Ltd. under the product name Cheerite Air, Apple Watch provided by Apple Inc, and any other devices equipped with an acceleration sensor.

The external devices 11a to 11c may be eyewears capable of acquiring a time length of viewing user's blink, blink frequency, eye movement, and any other biological information about the user. As this kind of eyewear, JINS MEME (trademark) provided by JIN Inc. may be used.

The external devices 11a to 11c may be configured to be communicably interconnected to the client devices 10a to 10c respectively. The external devices 11a to 11c and the client devices 10a to 10c may be connected respectively via Bluetooth (trademark), a wireless LAN, or any other wireless link. The external devices 11a to 11c may transmit the acquired nonverbal feedback information to the corresponding client devices 10a to 10c. Similarly to the nonverbal feedback information acquired by the client devices 10a to 10c, the nonverbal feedback information acquired by the external devices 11a to 11c may also be stored in association with a time code of the video at the time when nonverbal input was accepted by the external devices 11a to 11c.

The client devices 10a to 10c may transmit, to the server device 20, at least one selected from the group consisting of the verbal feedback information, the nonverbal feedback information, the evaluation information, and the gift information, together with a time code associated with the corresponding information and a user ID of the viewing user. For example, when such information is transmitted from the client device 10a to the server device 20, the information is transmitted in association with the user ID of the first viewing user who is using the client device 10a. The external devices 11a to 11c may transmit, together with the time code, the nonverbal feedback information to the corresponding client devices 10a to 10c or the server device 20.

Each of the client devices 10a to 10c and the external devices 11a to 11c is an example of a user device that provides the server device 20 with the nonverbal feedback information about a video from a viewing user who is viewing the video.

Next, a description is given of the server device 20. In the illustrated embodiment, the server device 20 includes a computer processor 21, a communication I/F 22, and a storage 23.

The computer processor 21 is a computing device which loads various programs realizing an operating system and various functions from the storage 23 or other storage into a memory unit and executes instructions included in the loaded programs. The computer processor 21 is, for example, a CPU, an MPU, a DSP, a GPU, any other computing device, or a combination thereof. The computer processor 21 may be realized by means of an integrated circuit such as ASIC, PLD, FPGA, MCU, or the like. Although the computer processor 21 is illustrated as a single component in FIG. 1, the computer processor 21 may be a collection of a plurality of physically separate computer processors. In this specification, a program or instructions included in the program that are described as being executed by the computer processor 21 may be executed by a single computer processor or executed by a plurality of computer processors distributively. Further, a program or instructions included in the program executed by the computer processor 21 may be executed by a plurality of virtual computer processors.

The communication I/F 22 may be implemented as hardware, firmware, or communication software such as a TCP/IP driver or a PPP driver, or a combination thereof. The server device 20 is able to transmit and receive data to and from other devices via the communication I/F 22.

The storage 23 is a storage device accessed by the computer processor 21. The storage 23 is, for example, a magnetic disk, an optical disk, a semiconductor memory, or various other storage device capable of storing data. Various programs may be stored in the storage 23. At least some of the programs and various data that may be stored in the storage 23 may be stored in a storage (for example, a storage provided in any of the client devices 10a to 10c and the external devices 11a to 11c, and/or a storage 60) that is physically separated from the server device 20.

The studio unit 30 will be now described. Most of components of the studio unit 30 are disposed, for example, in a studio room R shown in FIG. 2. As illustrated in FIG. 2, an actor A1 and an actor A2 give performances in the studio room R. The studio unit 30 is configured to detect motions and expressions of the actor A1 and the actor A2, and to output the detection result information to the server device 20.

Both the actor A1 and the actor A2 are objects whose motions and expressions are captured by a sensor group provided in the studio unit 30, which will be described later. In the illustrated embodiment, the actor A1 and the actor A2 are humans who give a performance. The actor A1 and the actor A2 may be animals or any other moving (non-living) objects other than humans. The actor A1 and the actor A2 may be, for example, autonomous robots. The number of actors in the studio room R may be one or three or more.

The studio unit 30 includes six motion sensors 31a to 31f attached to the actor A1, a controller 33a held by the left hand of the actor A1, a controller 33b held by the right hand of the actor A1, and a camera 37a attached to the head of the actor A1 via an attachment 37b, and a wristwatch-type actor device 91 worn on the left arm of the actor A1. The studio unit 30 further includes six motion sensors 32a to 32f attached to the actor A2, a controller 34a held by the left hand of the actor A2, a controller 34b held by the right hand of the actor A2, a camera 38a attached to the head of the actor A2 via an attachment 38b, and a wristwatch-type actor device 92 worn on the left arm of the actor A2. A microphone for collecting audio data may be provided to each of the attachment 37b and the attachment 38b. The microphone can collect speeches of the actor A1 and the actor A2 as voice data. The microphones may be wearable microphones attached to the actor A1 and the actor A2 via the attachment 37b and the attachment 38b. Alternatively the microphones may be installed on the floor, wall or ceiling of the studio room R. In addition to the components described above, the studio unit 30 further includes a base station 35a, a base station 35b, a digital camera 36a, a digital camera 36b, and a display 39. A supporter computer 40 is installed in a room next to the studio room R, and these two rooms are separated from each other by a glass window. The server device 20 may be installed in the same room as the room in which the supporter computer 40 is installed.

The motion sensors 31a to 31f and the motion sensors 32a to 32f cooperate with the base station 35a and the base station 35b to detect their position and orientation. In one embodiment, the base station 35a and the base station 35b are multi-axis laser emitters. The base station 35a emits flashing light for synchronization and then emits a laser beam about, for example, a vertical axis for scanning. The base station 35a emits a laser beam about, for example, a horizontal axis for scanning. Each of the motion sensors 31a to 31f and the motion sensors 32a to 32f may be provided with a plurality of optical sensors for detecting incidence of the flashing lights and the laser beams from the base station 35a and the base station 35b, respectively. The motion sensors 31a to 31f and the motion sensors 32a to 32f each may detect its position and orientation based on a time difference between an incident timing of the flashing light and an incident timing of the laser beam, time when each optical sensor receives the light and or beam, an incident angle of the laser light detected by each optical sensor, and any other information as necessary. The motion sensors 31a to 31f and the motion sensors 32a to 32f may be, for example, Vive Trackers provided by HTC CORPORATION. The base station 35a and the base station 35b may be, for example, base stations provided by HTC CORPORATION.

Detection result information about the position and the orientation of each of the motion sensors 31a to 31f and the motion sensors 32a to 32f that are estimated in the corresponding motion sensor is transmitted to the server device 20. The detection result information may be wirelessly transmitted to the server device 20 from each of the motion sensors 31a to 31f and the motion sensors 32a to 32f. Since the base station 35a and the base station 35b emit flashing light and a laser light for scanning at regular intervals, the detection result information of each motion sensor is updated at each interval.

In the illustrated embodiment, the six motion sensors 31a to 31f are mounted on the actor A. The motion sensors 31a, 31b, 31c, 31d, 31e, and 31f are attached to the back of the left hand, the back of the right hand, the left instep, the right instep, the hip, and top of the head of the actor A1, respectively. The motion sensors 31a to 31f may each be attached to the actor A1 via an attachment. The six motion sensors 32a to 32f are mounted on the actor A2. The motion sensors 32a to 32f may be attached to the actor A2 at the same positions as the motion sensors 31a to 31f. The motion sensors 31a to 31f and the motion sensors 32a to 32f shown in FIG. 2 are merely an example. The motion sensors 31a to 31f may be attached to various parts of the body of the actor A1, and the motion sensors 32a to 32f may be attached to various parts of the body of the actor A2. The number of motion sensors attached to the actor A1 and the actor A2 may be less than or more than six. As described above, body motions of the actor A1 and the actor A2 are detected by detecting the position and the orientation of the motion sensors 31a to 31f and the motion sensors 32a to 32f attached to the body parts of the actor A1 and the actor A2. Body motions of the actor A1 and the actor A2 may be detected by an optical motion capture system.

The controller 33a and the controller 33b supply, to the server device 20, control signals that correspond to operation of the actor A1. Similarly, the controller 34a and the controller 34b supply, to the server device 20, control signals that correspond to operation of the actor A2.

The digital camera 36a and the digital camera 36b capture the actor A1 and the actor A2 and generate captured image data. A position, an image capturing direction, and angle of view of the digital camera 36a are set in accordance with operation of the operator. The digital camera 36a transmits image-capturing configuration information that includes the position, image capturing direction, and angle of view of the digital camera 36a, to the server device 20. Similarly, a position, an image capturing direction, and an angle of view of the digital camera 36b are set in accordance with operation of the operator. The digital camera 36b transmits image-capturing configuration information that includes the position, image capturing direction, and angle of view of the digital camera 36b, to the server device 20. The digital camera 36a and the digital camera 36b may or may not transmit the captured image data (video data) to the server device 20. In the illustrated embodiment, the digital camera 36a is disposed on the left front of the actor A1. The digital camera 36b is disposed in front of the actor A1 and the actor A2 and approximately halfway between the actor A1 and the actor A2.

The camera 37a is attached to the head of the actor A1 as described above. For example, the camera 37a is disposed so as to capture an image of the face of the actor A1. The camera 37a continuously captures images of the face of the actor A1 to obtain imaging data of the face of the actor A1. The camera 37a may include an eye tracking sensor that directly detects eye movements of the actor A1. Similarly, the camera 38a is attached to the head of the actor A2. The camera 38a is disposed so as to capture an image of the face of the actor A2 and continuously capture images of the face of the actor A2 to obtain captured image data of the face of the actor A2. The camera 38a may include an eye tracking sensor that directly detects eye movements of the actor A2. The eye tracking sensors are, for example, eye-gaze tracking sensors that emit a near-infrared light beam into the iris and detects its reflected light. The camera 37a transmits the captured image data of the face of the actor A1 to the server device 20, and the camera 38a transmits the captured image data of the face of the actor A2 to the server device 20. The camera 37a and the camera 38a may be 3D cameras capable of detecting the depth of a face of a person. The camera 37a and the camera 38a may be, for example, a LIDAR device built in iPhone X provided by Apple Inc. The iPhone X may be attached to, for example, a headgear worn on the head of the actor A1. The camera 37a and the camera 38a may be each fixed to a camera stand installed in the studio room R, instead of being mounted on the actors A1 and A2 respectively.

The display 39 is configured to display information received from the supporter computer 40. The information transmitted from the supporter computer 40 to the display 39 may include, for example, text information, image information, and various other information. The display 39 is disposed at a position where the actor A1 and the actor A2 are able to see the display 39.

The actor device 91 is configured to generate a stimulus other than the sound that the actor A1 can perceive in response to a drive signal from the server device 20. If the actor device 91 generates a sound, the sound may be mixed with the distribution content. For this reason, the actor device 91 is configured to generate a stimulus other than the sound. The actor device 91 is capable of generating a stimulus other than an auditory stimulus (typically a sound), for example, a tactile stimulus, a visual stimulus, or any other stimulus that can be perceived by the actor A1 different from the auditory stimulus. The actor device 91 may include an actuator 91a. The actuator 91a is configured to be actuated in accordance with a drive signal from the server device 20. The actuator 91a may be configured to vibrate when the drive signal is supplied thereto. For example, Apple Watch provided by Apple Inc. may be used as the actor device 91. The actor device 91 may be formed in various forms and shapes other than the wristwatch form. The actor A1 can wear two or more actor devices 91 of the same types or different types from each other. The actor device 91 may be configured to operate in response to a drive signal from a device other than the server device 20. Two or more actor devices 91 may be associated with the actor ID that identifies the actor A1. The actor device 91 is able to transmit a tactile stimulus to the actor A1 via the actuator 91a. The actor device 91 may be an LED (Light Emitting Diode) or a perceptual display device. LEDs and perceptual display devices can generate visual stimuli. The perceptual display device may be an electrotactile display that drives nerve axons under the skin with current flowing from its electrode. The actor device 92 is configured to generate a stimulus other than the sound that the actor A2 can perceive in response to a drive signal from the server device 20. The description of the actor device 91 also applies to the actor device 92.

In the illustrated embodiment, the supporter computer 40 is installed in the next room of the studio room R. Since the room in which the supporter computer 40 is installed and the studio room R are separated by the glass window, an operator of the supporter computer 40 (sometimes referred to as "supporter" in the specification) is able to see the actor A1 and the actor A2. In the illustrated embodiment, supporters B1 and B2 are present in the room as the operators of the supporter computer 40.

The supporter computer 40 may be configured to be capable of changing the setting(s) of the component(s) of the studio unit 30 according to the operation by the supporter B1 and the supporter B2. The supporter computer 40 is capable of changing configurations of various devices, for example, a scanning interval performed by the base station 35a and the base station 35b, and the image capturing directions or angles of view of the digital camera 36b and the digital camera 36b. Switching between active cameras which will be described later may be performed based on operation of the supporter computer 40 performed by the supporter B1 and the supporter B2. At least one of the supporter B1 and the supporter B2 is able to input a message to the supporter computer 40, and the input message is displayed on the display 39.

The components and functions of the studio unit 30 shown in FIG. 2 are merely example. The studio unit 30 applicable to the invention may include various constituent elements that are not shown. Shooting for generating a video to distribute may be performed by simpler equipment. For example, by an information processing terminal such as a smartphone, face motion data, which is a digital representation of the actor's facial movements, is generated and then an animation of a character object whose body stays still but its face moves in synchronization with the actor's facial expression may be generated based on the face motion data. The face motion data may include tracking data concerning posture of the actor's head, feature points that are digital representations of feature points of the actor's face, and blend face data representing deformation rates of the feature points. An information processing terminal such as a smartphone may generate an image of the actor's face whose facial expression is exaggerated based on the face motion data, and may display the generated image such that the image is superimposed on the face of the character object. When generating an animation of a character object based on face motion data, the motion sensors 31a, 31b, 31c, 31d, 31e, and 31f, the base stations 35a and 35b, and the digital cameras 36a and 36b for detecting movements of the actor's body are not required so that the animation of the character object can be generated with simpler equipment. If the motion sensors 31a, 31b, 31c, 31d, 31e, and 31f, the base stations 35a and 35b, and the digital cameras 36a and 36b are not required, generation of a character object can be performed in any places in addition to the studio room R, for example, at the actor's home. Therefore convenience for the users is enhanced.

The studio unit 30 may include a projector. The projector is able to project a video distributed to the client device 10a or another client device on the screen S.

Data stored in the storage 23 will be described. In the illustrated embodiment, in the storage 23, model data 23a, object data 23b, verbal feedback information 23c1, nonverbal feedback information 23c2, evaluation information 23c3, gift information 23c4, actor information 23c5, and any other information as necessary.

The model data 23a is model data for generating an animation of a character. The model data 23a may be three-dimensional model data for generating three-dimensional animation, or may be two-dimensional model data for generating two-dimensional animation. The model data 23a includes, for example, rig data (also referred to as "skeleton data") indicating a skeleton of a character, and skin data indicating the shape or texture of a surface of the character. The model data 23a may include two or more different pieces of model data. The pieces of model data may each have different rig data, or may have the same rig data. The pieces of model data may have different skin data or may have the same skin data. In the illustrated embodiment, in order to generate a character object corresponding to the actor A1 and a character object corresponding to the actor A2, the model data 23a includes at least two types of model data different from each other. The model data for the character object corresponding to the actor A1 and the model data for the character object corresponding to the actor A2 may have, for example, the same rig data but different skin data from each other.

The object data 23b includes asset data used for constructing a virtual space in the video. The object data 23b includes data for rendering a background of the virtual space in the video, data for rendering various objects displayed in the video, and data for rendering any other objects displayed in the video. The object data 23b may include object position information representing the position of an object in the virtual space.

In addition to the above, the object data 23b may include a gift object representing a gift displayed in the video in response to a display request from viewing users of the client devices 10a to 10c. The gift object is an object that simulates, for example, a stuffed toy, a bouquet, an accessory (such as a headband, a necklace, an earring, etc.), clothes (such as a T-shirt), a costume, confetti, fireworks and the like. A duration of time of displaying a gift object may be set depending on its type.

The verbal feedback information from the client devices 10a to 10c is stored in the storage 23 as the verbal feedback information 23c1. As shown in FIG. 3, the verbal feedback information is text data representing a comment that has been text-inputted or speech-input by a viewing user, and the text data is stored in association with account information of the viewing user who made the input and a time code of the video at the time when the input was performed.

The nonverbal feedback information from the client devices 10a to 10c and/or the external devices 11a to 11c is stored in the storage 23 as the nonverbal feedback information 23c2. As shown in FIG. 4, the nonverbal feedback information is stored in association with account information of a viewing user who made the nonverbal input and a time code of the video at the time when the nonverbal input was performed. As described above, the nonverbal feedback information may include an acceleration of the viewing user detected by the acceleration sensor, biological information of the viewing user detected by the biological information sensor, and the viewing information indicating whether the viewing user is viewing the video based on captured image information generated via a camera, and the emotion information representing an emotion of the viewing user. As the nonverbal feedback information may include an acceleration of the viewing user detected by the acceleration sensor, biological information of the viewing user detected by the biological information sensor, and the viewing information indicating whether the viewing user is viewing the video, and the emotion information representing an emotion of the viewing user.

The evaluation information from the client devices 10a to 10c is stored in the storage 23 as the evaluation information 23c3. As shown in FIG. 5, the evaluation information is stored in association with account information of the viewing user who evaluated the video and a time code of the video at the time when the evaluation was performed and inputted. As the evaluation information 23c3, one or more selected from the group consisting of information indicating the number of positive evaluations (for example, the number of Likes), information indicating the number of negative evaluations (for example, the number of Dislikes), rating information, and emotion information representing how the viewing user feel about the video (e.g., the number of applause and the number of question marks) may be stored.

The gift information from the client devices 10a to 10c is stored in the storage 23 as the gift information 23c4. As shown in FIG. 6, the gift information is stored in associated with the account information of the viewing user who performed the gift purchase process or the gifting process and the time code of the video at the time when the gift purchase process or the gifting process was performed. As the gift information 23c4, there is one or more selected from the group consisting of the gift purchase information indicating the types of purchased gifts, the number of purchased gifts, and the amount of money spent for the purchased gifts; and the gifting information indicating the types and the number of gifts provided to the actor and the amount of money spent for the gifts provided to the actor.

The actor information 23c5 is information representing motions of the actor A1 and the actor A2. In one embodiment, the body motion data of the actors A1 and A2, the face motion data of the actors A1 and A2, and the voice data including the voice volume of the actors A1 and A2 acquired through a microphone are obtained at a predetermined sampling rate. The obtained acceleration and the voice data are stored as the actor information 23c5 in association with a time code of the video. As will be described later, an animation of character objects whose facial expressions change in synchronization with change of the facial expressions of the actor A1 and actor A2 is generated based on the face motion data of actor A1 and actor A2. As an image of the face of the character object, a prepared image prepared in advance can be used instead of the animation generated based on the actor's face motion data. The prepared image is used as the image of the character object's face when instructed from any one of the actor A1, the actor A2, the supporter B1, and the supporter B2. The actor information 23c5 may include face input data indicating whether generation of a face image using the prepared image was performed.

Functions realized by the computer processor 21 will be now described more specifically. The computer processor 21 functions as a body motion data generation unit 21a, a face motion data generation unit 21b, an animation generation unit 21c, a video generation unit 21d, a video distribution unit 21e, a display request processing unit 21f, an actor information management unit 21g, a received information management unit 21h, and a timeline information generation unit 21i by executing computer-readable instructions included in a video distribution program. At least some of the functions that can be realized by the computer processor 21 may be realized by a computer processor other than the computer processor 21 of the video distribution system 1. For example, at least some of the functions realized by the computer processor 21 may be realized by a computer processor mounted on the supporter computer 40.

The body motion data generation unit 21a generates first body motion data of each part of the body of the actor A1 based on detection result information of the corresponding motion sensors 31a to 31f, and generates second body motion data, which is a digital representation of the position and the orientation of each part of the body of the actor A2, based on detection result information of the corresponding motion sensors 32a to 32f. In the specification, the first body motion data and the second body motion data may be collectively referred to simply as "body motion data." The body motion data is serially generated with time as needed. For example, the body motion data may be generated at a predetermined sampling time interval. Thus, the body motion data can represent body motions of the actor A1 and the actor A2 in time series as digital data. In the illustrated embodiment, the motion sensors 31a to 31f and the motion sensors 32a to 32f are attached to the left and right limbs, the waist, and the head of the actor A1 and the actor A2, respectively. Based on the detection result information of the motion sensors 31a to 31f and the motion sensors 32a to 32f, it is possible to digitally represent the position and orientation of the substantially whole body of the actor A1 and the actor A2 in time series. The body motion data can define, for example, the position and rotation angle of bones corresponding to the rig data included in the model data 23a.

The face motion data generation unit 21b generates first face motion data, which is a digital representation of motions of the face of the actor A1, based on captured image data of the camera 37a, and generates second face motion data, which is a digital representation of motions of the face of the actor A2, based on captured image data of the camera 38a. In the specification, the first face motion data and the second face motion data may be collectively referred to simply as "face motion data." The face motion data is serially generated with time as needed. For example, the face motion data may be generated at a predetermined sampling time interval. Thus, the face motion data can digitally represent facial motions (changes in facial expression) of the actor A1 and the actor A2 and a deformation contribution rate reflected in the facial expression of the character object in time series.

The animation generation unit 21c is configured to apply the body motion data generated by the body motion data generation unit 21a and the face motion data generated by the face motion data generation unit 21b to predetermined model data included in the model data 23a in order to generate an animation of a character object that moves in a virtual space and whose facial expression changes. More specifically, the animation generation unit 21c may generate an animation of a character object moving in synchronization with the motion of the body and facial expression of the actor A1 based on the first body motion data and the first face motion data related to the actor A1, and generate an animation of a character object moving in synchronization with the motion of the body and facial expression of the actor A2 based on the second body motion data and the second face motion data related to the actor A2. In the specification, a character object generated based on the motion and expression of the actor A1 may be referred to as a "first character object", and a character object generated based on the motion and expression of the actor A2 may be referred to as a "second character object." When generating an animation of a character object, the kinematics of the character object may be complemented with inverse kinematics or other algorithm in order to reduce occlusion and noise.

The process of applying the face motion data to the model data to change the facial expression of a character object imposes a high processing load on the processor. For this reason, the facial expression of the character object may fail to follow the facial expression of the actor in a timely manner. The animation generation unit 21c generates a character object that incorporates a prepared image to be fitted in the image of the face of the character object, and the video containing the generated character object with the prepared face image may be distributed. In this way, it is possible to prevent deterioration of the quality of the video caused by the fact that the facial expression of the character object fails to follow the facial expression of the actor.

The video generation unit 21d constructs a virtual space using the object data 23b, and generates a video that includes the virtual space, the animation of the first character object corresponding to the actor A1, and the animation of the second character object corresponding to the actor A2. The first character object is disposed in the virtual space so as to correspond to the position of the actor A1 captured by the digital camera 36a, and the second character object is disposed in the virtual space so as to correspond to the position of the actor A2 captured by the digital camera 36a. Thus, it is possible to change the position and the orientation of the first character object and the second character object in the virtual space by changing the image-capturing configuration information (at least one selected from the group consisting of the position, the capturing direction, and the angle of view, of the camera).

In one embodiment, the video generation unit 21d constructs a virtual space based on the image-capturing configuration information of the digital camera 36a. For example, the video generation unit 21d determines configuration information (a gaze position, a gazing direction, and the angle of view) of the virtual camera based on the image-capturing configuration information of the digital camera 36a. Moreover, the video generation unit 21d determines a rendering area in the entire virtual space based on the configuration information of the virtual camera and generates video information for displaying the rendering area in the virtual space.

The video generation unit 21d may be configured to determine the position and the orientation of the first character object and the second character object in the virtual space, and the configuration information of the virtual camera based on image-capturing configuration information of the digital camera 36b instead of or in addition to the image-capturing configuration information of the digital camera 36a. The video generation unit 21d may be configured to set the configuration information of the virtual camera based on the image-capturing configuration information of the selected one of the digital camera 36a and the digital camera 36b (may be also hereunder referred to as an "active camera").

The video generation unit 21d is able to include voices of the actor A1 and the actor A2 collected by the microphone in the studio unit 30 with the generated video.

As described above, the video generation unit 21d generates an animation of the first character object moving in synchronization with the motion of the body and facial expression of the actor A1, and an animation of the second character moving in synchronization with the motion of the body and facial expression of the actor A2. The video generation unit 21d then includes the voices of the actor A1 and the actor A2 with the animations respectively to generate a video for distribution.

The video distribution unit 21e encodes the video generated by the video generation unit 21d at a predetermined frame rate (for example, 60 fps), and distributes the encoded video. A time code is inserted into each frame created through this encoding. The video is distributed to the client devices 10a to 10c and other client devices over the network 50. The received video is reproduced in the client devices 10a to 10c.

The video may be distributed to a client device (not shown) installed in the studio room R, and projected from the client device onto the screen S via a short focus projector. The video may also be distributed to the supporter computer 40. In this way, the supporter B1 and the supporter B2 can check the viewing screen of the distributed video.

Figure 8:
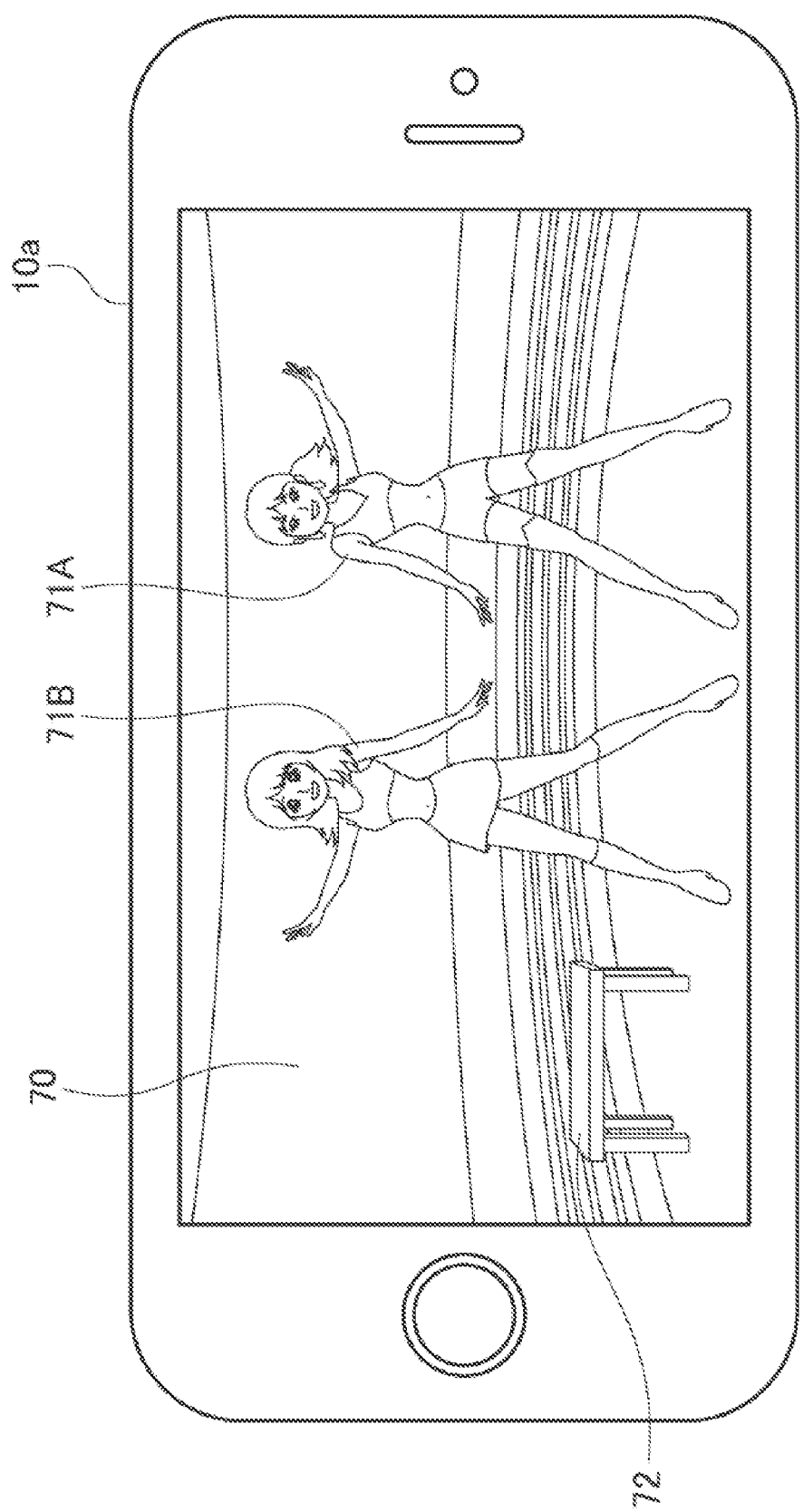
FIG. 8 illustrates an example of a video displayed on the client device 10a in one embodiment. An animation of a character object is included in FIG. 8.

An example of the screen on which the video distributed from the server device 20 to the client device 10a and reproduced by the client device 10a is displayed is illustrated in FIG. 8. As shown, a display image 70 of the video distributed from the server device 20 is displayed on the display of the client device 10a. The display image 70 displayed on the client device 10a includes a character object 71A corresponding to the actor A1, a character object 71B corresponding to the actor A2, a table object 72a representing a table placed on the floor in a virtual space.

The character object 71A is generated by applying the first body motion data and the first face motion data of the actor A1 to the model data for the actor A1 included in the model data 23a. The character object 71A is motion-controlled based on the first body motion data and the first face motion data. The character object 71B is generated by applying the second body motion data and the second face motion data of the actor A2 to the model data for the actor A2 included in the model data 23a. The character object 71B is motion-controlled based on the second body motion data and the second face motion data. Thus, the character object 71A is controlled to move in the screen in synchronization with the motions of the body and facial expression of the actor A1, and the character object 71B is controlled to move in the screen in synchronization with the motions of the body and facial expression of the actor A2.

Figure 9:
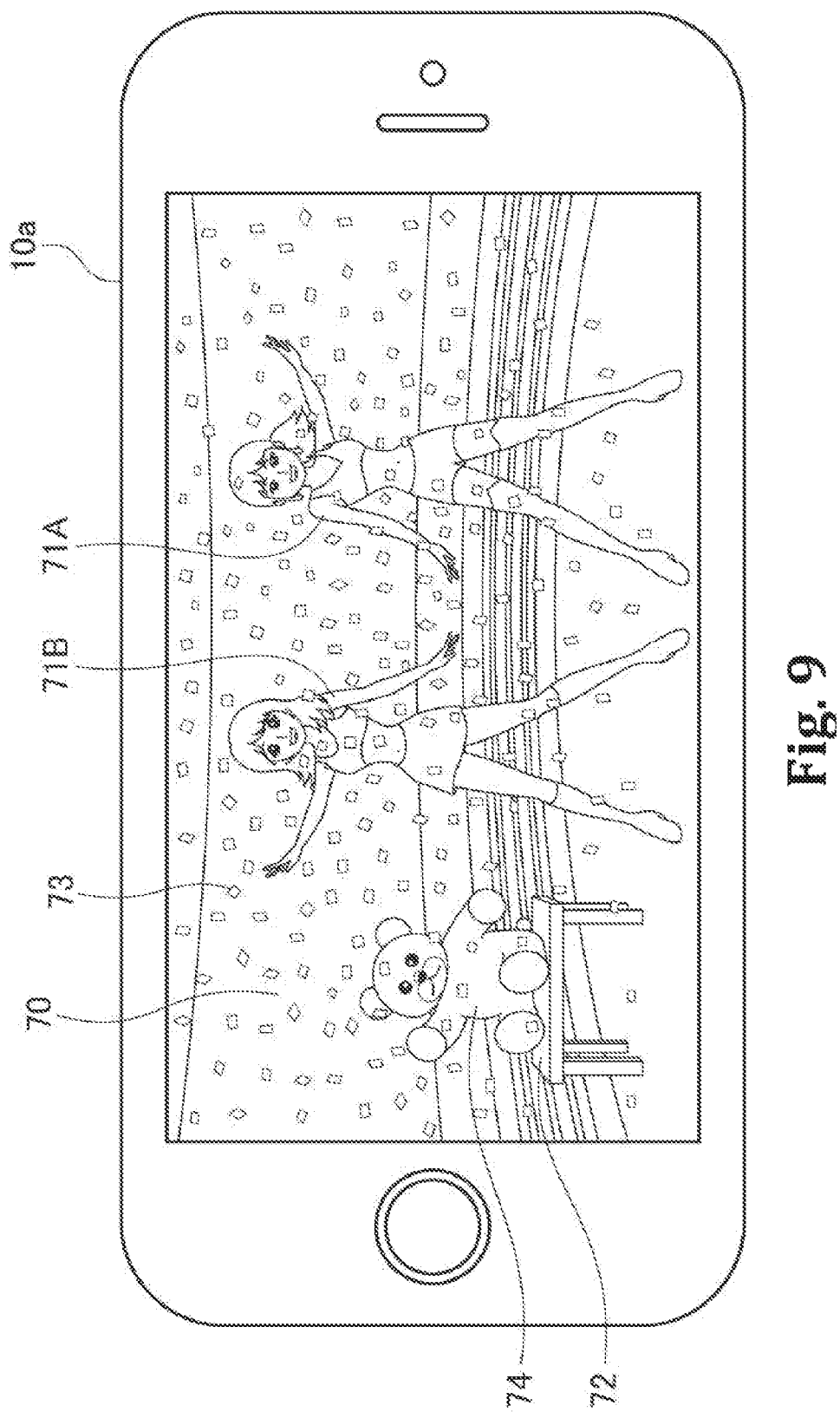
FIG. 9 illustrates an example of a video displayed on the client device 10a in one embodiment. A gift object is included in FIG. 9.

In one embodiment, when the video generation unit 21d accepted a display request to display a specific gift object from a viewing user, the video generation unit 21d performs a process, in response to the display request, to display the gift object for which the display request is made in the display image 70 of the video. For example, when a display request to display a gift object corresponding to confetti and a normal object simulating a stuffed bear is made, the video generation unit 21d displays an object 73 representing the confetti and an object 74 representing the stuffed bear in the display image 70 based on the display request as shown in FIG. 9.

As described above, the video from the server device 20 may be distributed to the supporter computer 40. The video distributed to the supporter computer 40 is displayed on the supporter computer 40 in the same manner as FIG. 4. The supporter B1 and the supporter B2 are able to change the configurations of the components of the studio unit 30 while viewing the video reproduced by the supporter computer 40. In one embodiment, when the supporter B1 and the supporter B2 wish to change the angle of the character object 71A and the character object 71B in the video being distributed, they can cause an instruction signal for changing the image capturing direction of the digital camera 36a to be sent from the supporter computer 40 to the digital camera 36a. The digital camera 36a is configured to change the image capturing direction in accordance with the instruction signal. For example, the digital camera 36a may be rotatably attached to a stand via a pivoting mechanism that includes an actuator disposed around the axis of the stand. When the digital camera 36a received an instruction signal instructing to change its image capturing direction, the actuator of the pivoting mechanism may be driven based on the instruction signal, and the digital camera 36a may be turned by an angle according to the instruction signal. In one embodiment, the supporter B1 and the supporter B2 may cause the supporter computer 40 to transmit an instruction signal instructing to change the angle of view to the digital camera 36a. In one embodiment, the supporter B1 and the supporter B2 may cause the supporter computer 40 to transmit, to the digital camera 36a and the digital camera 36b, an instruction to use the image capturing configuration information of the digital camera 36b instead of the image capturing configuration information of the digital camera 36a.

In one embodiment, when the supporter B1 and the supporter B2 determine that some instructions are needed for the actor A1 or the actor A2 as they are viewing the video reproduced on the supporter computer 40, they may input a message indicating the instruction(s) into the support computer 40 and the message may be output to the display 39. For example, the supporter B1 and the supporter B2 can instruct the actor A1 or the actor A2 to change his/her standing position through the message displayed on the display 39.

The display request processing unit 2 if receives a display request to display a gift from a client device of a viewing user, and performs processing according to the display request. Each viewing user is able to transmit a display request to display a gift to the server device 20 by operating his/her client device. For example, the first viewing user is able to operate the client device 10a to cause the client device 10a to transmit a display request to display a gift to the server device 20. The display request to display a gift may include the user ID of the viewing user and the identification information (object ID) that identifies the gift for which the display request is made. For example, when a display request to display a gift simulating confetti is made by a viewing user, the display request processing unit 21f displays, in the display image 70, effect object 73 simulating confetti based on the display request as shown in FIG. 9. Similarly, when a display request to display a gift simulating a stuffed bear is made by a viewing user, the display request processing unit 21f displays an object 74 simulating the stuffed bear in the display image 70 based on the display request.

The actor information management unit 21g obtains actor information representing motions of the actor A1 and the actor A2 at a predetermined sampling rate, and stores the acquired actor information in the storage 23. Specifically, the actor information management unit 21g calculates accelerations of motions of predetermined parts (for example, the head, arm, and palm) of the actor A1 and the actor A2 based on detection signals of the motion sensors 31a to 31f and the motion sensors 32a to 32f. The actor information management unit 21g then adds time codes that depend on the sampling rate to the calculated accelerations and stored in the storage 23 as the actor information 23c5. The actor information management unit 21g may store square-root of sum of squares of the three-axis accelerations detected by the motion sensors 31a to 31f and the motion sensors 32a to 32f in the storage 23 as the actor information 23c5. The actor information management unit 21g acquires voice data of the actor A1 and the actor A2 collected by the microphone provided in the studio R, and stores the acquired voice data in the storage 23 as the actor information 23c5. As the actor information 23c5, the voice volume may be used from the voice data. When a prepared image is used as the image of the face of the character object of the actor A1 or the actor A2, the actor information management unit 21g may store the face input data indicating that generation of the face image using the prepared image has been performed in the storage 23 in association with a time code.

The received information management unit 21h stores the verbal feedback information, the evaluation information, and the gift information obtained from the client devices 10a to 10c in the storage 23 in association with time codes of the video at the time when these pieces of information are acquired in the respective client devices 10a to 10c. The verbal feedback information, the evaluation information, and the gift information are stored in the storage 23 as the verbal feedback information 23c1, the evaluation information 23c3, and the gift information 23c4, respectively. Further, the received information management unit 21h stores the nonverbal feedback information acquired from the client devices 10a to 10c and the external devices 11a to 11c in the storage 23 in association with time codes of the video as the nonverbal feedback information 23c2. The received information management unit 21h receive the verbal feedback information, the nonverbal feedback information, the evaluation information, and the gift information from a large number of client devices used for viewing the video distributed from the server device 20 in addition to the client devices 10a to 10c, and a large number of external devices in addition to the external devices 11a to 11c. The received information management unit 21h updates the verbal feedback information 23c1, the nonverbal feedback information 23c2, the evaluation information 23c3, and the gift information 23c4 based on the received information.

The timeline information generation unit 21i generates timeline information that shows the nonverbal feedback information 23c2 and the actor information 23c5 stored in the storage 23 in time series. The timeline information may include at least one of the verbal feedback information 23c1, the evaluation information 23c3, and the gift information 23c4. The timeline information is information that shows the nonverbal feedback information 23c2 and the actor information 23c5 in time series. The timeline information generation unit 21i is capable of displaying the generated timeline information on a display. The timeline information may be displayed in a real time manner on the display 39, the display of the supporter computer 40, and any other displays. The generated timeline information may be stored in the storage 23. A video creator is able to retrieve and use the timeline information from the storage 23 when he/she analyzes reaction of viewing users to the video and the actor's performance.

Figure 10:
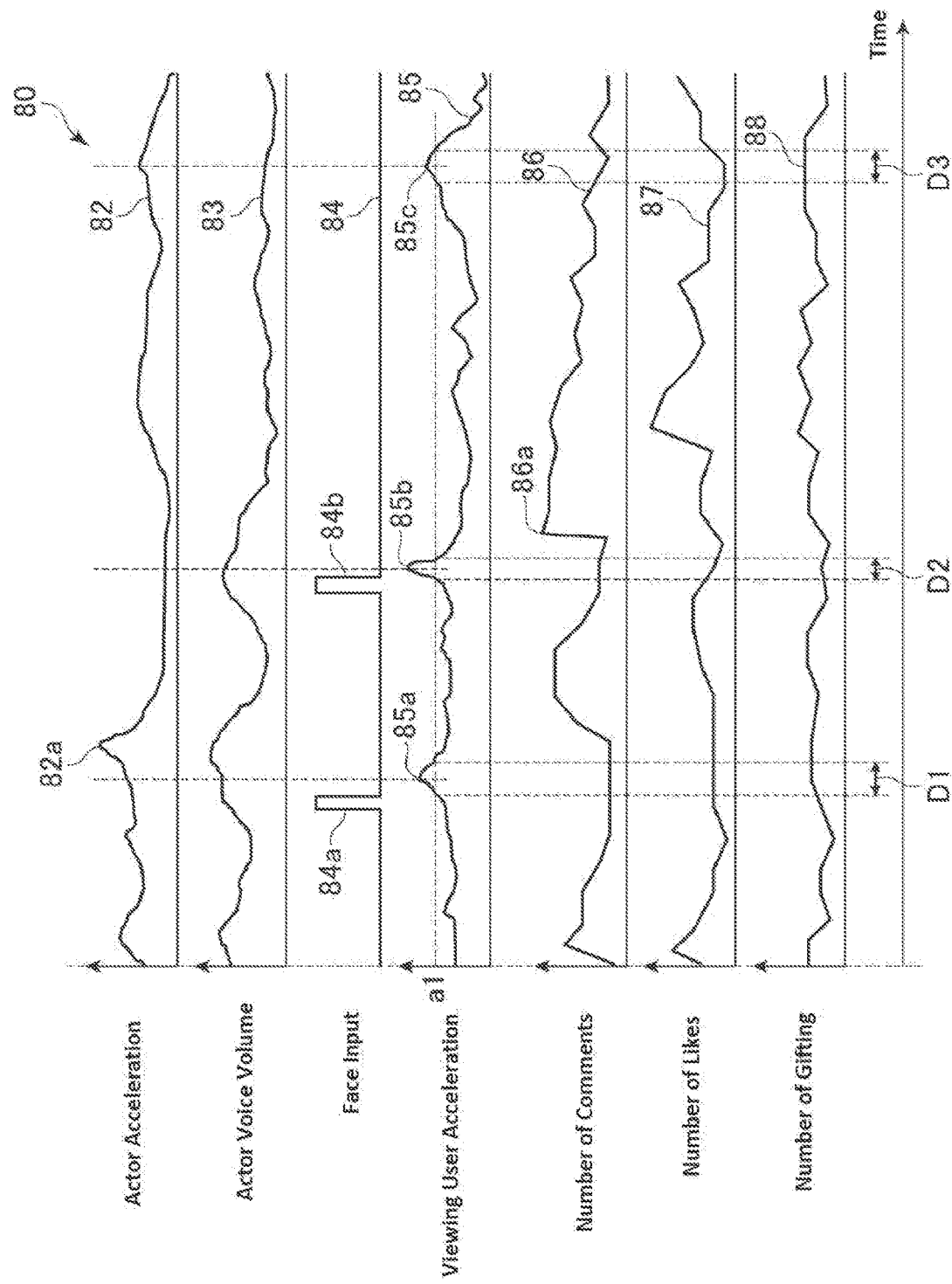
FIG. 10 illustrates a display example of timeline information.

FIG. 10 illustrates a display example of the timeline information. Referring to FIG. 10, timeline information 80 in one embodiment includes graphs 82 to 84 generated based on the actor information 23c5, a graph 85 generated based on the nonverbal feedback information 23c2, and other graphs 86 to 88. The graphs 82 to 88 are created based on the time codes given to the actor information and the graphs 85 to 88 are created based on the time codes given to the video stream. These graphs can be synchronized by matching the time codes given to the actor information and the time codes given to the distributed video stream with reference to a predetermined reference time. Thus, the graphs 82 to 88 are displayed in the common timeline.

The graph 82 is a graph showing the acceleration of the motions of the actor A1 in time series. The graph 83 is a graph showing the voice volume of the actor A1 in time series. The graph 84 is a graph showing, in time series, the face input data indicating whether generation of a face image using a prepared image has been performed for the character of the actor A1. A pulse 84a and a pulse 84b in the graph 84 indicate that a face image was generated using a prepared image at the time when the pulse 84a and the pulse 84b were generated. Any of the graphs 82 to 84 may be created based on the actor information 23c5 stored in the storage 23. The timeline information 80 may include graphs similar to the graphs 82 to 84 for the actor A2.

The graph 85 is a graph showing the acceleration of motions of the first viewing user while the first viewing user is viewing the video in time series. The graph 85 may be created based on the nonverbal feedback information 23c2 stored in the storage 23. The graph 85 may be a graph representing the acceleration of a single viewing user (for example, the first viewing user using the client device 10a), a sum of accelerations obtained by adding the accelerations of two or more viewing users, or an average value of the accelerations of the two or more viewing users. In order to grasp the viewing state of one of the viewing users individually, a graph showing the acceleration of motions of the single viewing user is used. To grasp the average tendency of the viewing state of the viewing users, the sum or average of the accelerations of the plurality of viewing users are used. In the illustrated example, the graph 85 shows the average value of the accelerations of the plurality of viewing users per unit time.

The graph 86 is a graph showing the number of comments per unit time (for example, one second or one minute) posted by a viewing user(s) in time series. The graph 86 may be created based on the verbal feedback information 23c1 stored in the storage 23. The graph 86 may be a graph showing the number of comments per unit time posted from a single viewing user, or a graph showing the total or average number of comments per unit time posted from a plurality of viewing users. The graph 86 may be created by counting the number of comments posted at a predetermined time interval based on the verbal feedback information 23c1 for each unit time and plotting the count value on the vertical axis.

The graph 87 is a graph showing the evaluation information per unit time (for example, one second or one minute) posted by a viewing user(s) in time series. In the illustrated example, the graph 87 may be created by counting the number of positive evaluations (the number of Likes) posted from the viewing user for the video at a predetermined time interval based on the evaluation information 23c3, and plotting the count value on the vertical axis. Thus, the vertical axis of the graph 87 indicates the number of times that the positive evaluation for the video was made per unit time (the number of Likes). Instead of or in addition to the graph 87, at least one selected from the group consisting of the number of negative evaluations (the number of Dislikes) posted by the viewing users for the video, the rating information, and the emotion information that indicates the emotion of the viewing user to the video may be shown in the graph in time series. The graph 87 may be created based on the evaluation information 23c1 stored in the storage 23. The graph 87 may be a graph showing the evaluation information (for example, the number of Likes) from a single viewing user, or may be a graph showing the sum of the evaluation information from a plurality of viewing users or an average value thereof.

The graph 88 is a graph showing, in time series, the gift information indicating gifts purchased by a viewing user or gifts provided to an actor by the viewing user. In the illustrated example, the graph 88 shows the number of gifts per unit time (for example, one second or one minute) provided (gifting) by the viewing user to the actor A1. The graph 88 may indicate an average of the number of gifts provided to the actor A1 from the viewing user for each predetermined time period. Instead of or in addition to the graph 88, may be displayed at least one of the group consisting of a graph showing the amount of money spent for gift(s) provided (gifting) to the actor A1 by the viewing user, a graph showing the number of gifts or the amount of money spent for the gift(s) purchased (or considered to be purchased) by the viewing user (regardless of whether or not the gift(s) are actually provided to the actor), and a graph showing the amount of points gained by the purchase of the gift(s) by the viewing user. The graph 88 may be displayed for each type of gift. For example, when there are three types of gifts, the graph 88 may be a set of graphs corresponding to the three types of gifts. For example, the gift may include a first gift displayed behind a character object of the actor A1, a second gift displayed in front of the character object of the actor A1, and a third gift attached to the character object of the actor A1. When the graph 88 includes graphs corresponding to two or more types of gift, the number of times gifting is performed, the number of purchased gifts, and the amount of money spent for the gifts can be managed for each gift type. The graph 88 may be created based on the gift information 23c4 stored in the storage 23. The graph 88 may be a graph showing the number gifts purchased, the number of gifts given to an actor, or the amount of money spent for the gifts purchased by a single viewing user. Alternatively the graph 88 may be a graph showing the number gifts purchased, the number of gifts given to an actor, or the amount of money spent for the gifts purchased by multiple viewing users.

As described above, the timeline information 80 can show the actor information representing behavior of an actor and the nonverbal feedback information from viewing users in time series in synchronization with each other so that the video creator or the video distributor (for example, the actor A1, the actor A2, the supporter B1, and the supporter B2) is able to obtain useful feedback on actor's performance based on the timeline information 80. In particular, comparing the graph 85 that shows the nonverbal feedback from a viewing user(s) with the graphs 82 to 84 showing the movements of the actor, it is possible to obtain useful information regarding the actor's performance. For example, the graph 85 has three peaks 85a, 85b, 85c during the shown distribution period. These three peaks 85a, 85b, and 85c indicate that the viewing user(s) is assumed to have laughed at the time of occurrence of each peak while viewing the video. Moreover, in the illustrated embodiment, it can be seen from the graph 84 that the face image was generated using the prepared image slightly before the peak 85a and the peak 85b so that it can be assumed that there were many viewing users who laughed at these moments when a composite face image using the prepared image was displayed.

The graph 86 has a peak 86a, and the graph 87 has a peak 87a. Analyzing the actor information as of slightly before these peaks 86a and 87a may provide further useful feedback on the actor's performance. Since the graph 86 and the graph 87 detect intentional behavior of the viewing user(s) such as input of texts of comments or input of the evaluation information, it may be necessary to take into account that the times at which the peak 86a and the peak 87a occurred were later than the time when the viewing users intended to perform the inputs.

From the graph 87, it is possible to know which performance of the actor a viewer user(s) gave a positive evaluation. As described above, the graph 87 may be a graph showing emotion information that represents emotions of the viewing user(s) to the video in time series. In other words, the graph 87 may be a graph showing a change of the total of the viewer user's emotion information over time or a change of the average of the emotion information per unit time over time. As described above, the graph 87 showing the change in the emotion information over time and the graphs 82 to 84 generated based on the actor information can be displayed on the common timeline. Therefore, based on the graphs 82 to 84 and the graph 87, it is possible to grasp what performance, movement, or effect of the actor has caused the feedback from the viewing users through the emotion information. The creator of the video is able to improve effects of the video when creating the video based on the relationship thus grasped between the actor's performance, movements, or effects and the feedback from the viewing users through the emotion information. The creator of the video is also able to recommend his/her video to viewing users based on the relationship thus grasped between performance and movement of the actor or effects and the feedback from the viewing users through the emotion information.

The graph 87 may be a graph showing, for an individual viewing user, the emotion information provided from the viewing user in time series. In this case, the graph 87 showing change of the emotion information from the individual viewing user over time and the graphs 82 to 84 generated based on the actor information can be displayed on the common timeline. Thereby, based on the emotion information provided from the individual viewing user, it is possible to improve effects of the video when creating the video and to recommend the video to the viewing users.

A non-limiting example of improvement in the production during video production will be now given. For example, when the creator tries to increase feedback of a given emotion (for example, surprise), the creator may first extract the performances, motions or effects (hereunder may be referred to as an "actor effect") of the actor that contributed to cause the emotion in a distributed video based on the graph 87 and the graphs 82 to 84 shown in the common timeline. The creator may then increase the number or frequency of the actor expression that contributed to cause the emotion in a new video when creating in order to increase the feedback of the emotion in this video. In the same way as the above emotion increasing method, it is also possible to increase the number of Likes and the number of times gifting is performed by viewing users for the video.

Based on the timeline information 80, useful feedback for optimizing the performance of the server device 20 is obtained in order to evaluate the throughput of the video distribution system 1.

Based on the timeline information 80, useful feedback is obtained for analyzing load of a display process of a gift display request processed in the display request processing unit 21f, a comment request process, and a video generation process performed in the video generation unit 21d.

It is also possible to obtain useful feedback to reproduce a desired response from a viewing user(s) based on the timeline information 80. In these ways, the quality of the produced video content can be improved.

Figure 11:
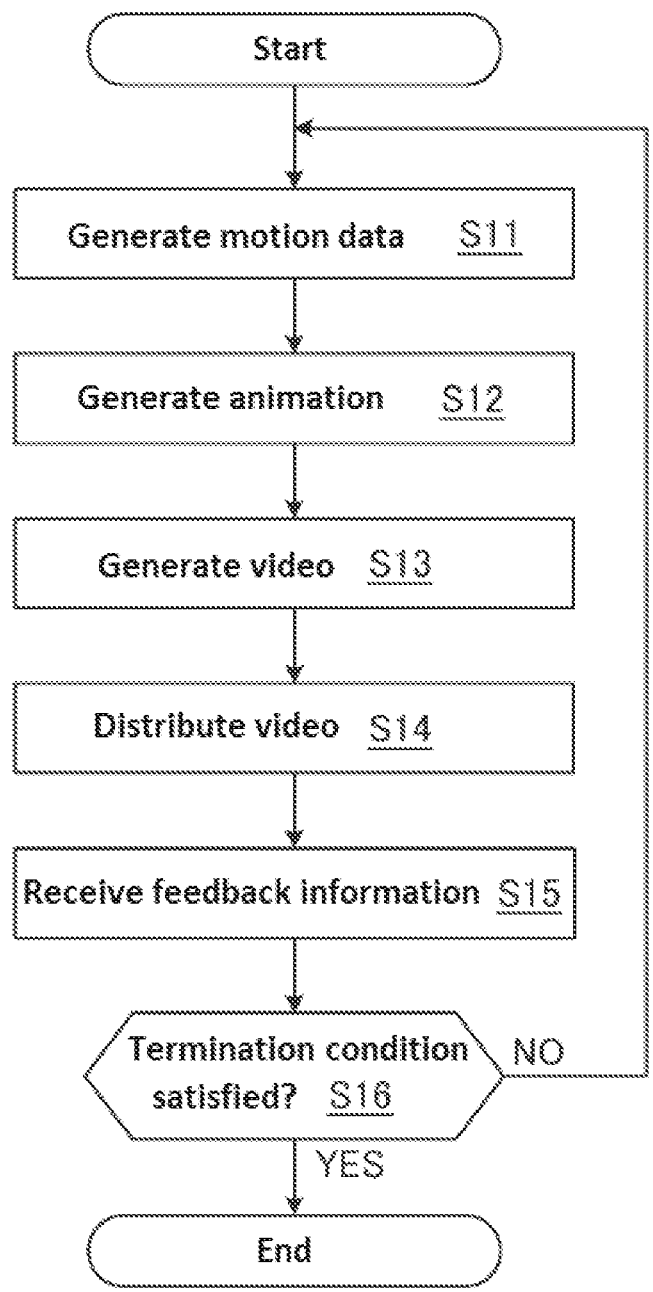
FIG. 11 is a flow chart showing flow of a video distribution process in one embodiment.

Next, with reference to FIG. 11, a video distribution process in one embodiment will be described. FIG. 11 is a flow chart showing a flow of a video distribution process in one embodiment. In the video distribution process, it is assumed that the actor A1 and the actor A2 are giving performances in the studio room R.

First, in step S11, body motion data, which is a digital representation of the body motions of the actor A1 and the actor A2, and face motion data, which is a digital representation of the facial motions (expression) of the actor A1 and the actor A2, are generated. Generation of the body motion data is performed, for example, by the body motion data generation unit 21a described above, and generation of the face motion data is performed, for example, by the face motion data generation unit 21b described above.

Next, in step S12, the body motion data and the face motion data of the actor A1 are applied to the model data for the actor A1 to generate an animation of the first character object that moves in synchronization with the motions of the body and facial expression of the actor A1. Similarly, the body motion data and the face motion data of the actor A2 are applied to the model data for the actor A2 to generate animation of the second character object that moves in synchronization with the motions of the body and facial expression of the actor A2. The generation of the animation is performed, for example, by the above-described animation generation unit 21c.

Next, in step S13, a video including the animation of the first character object corresponding to the actor A1 and the animation of the second character object corresponding to the actor A2 is generated. The voices of the actor A1 and the actor A2 may be included in the video. The animation of the first character object and the animation of the second character object may be provided in the virtual space. Generation of the video is performed, for example, by the above-described video generation unit 21d.

Next, the process proceeds to step S14 where the video generated in step S13 is distributed. The video is distributed to the client devices 10a to 10c and other client devices over the network 50. The video may be distributed to the supporter computer 40 and/or may be projected on the screen S in the studio room R. The video is distributed continuously over a predetermined distribution period. The distribution period of the video may be set to, for example, 30 seconds, 1 minute, 5 minutes, 10 minutes, 30 minutes, 60 minutes, 120 minutes, and any other length of time.

Next, the process proceeds to step S15 and feedback information from a viewing user with respect to the video distributed at step S14 is received. The received feedback information is stored in the storage 23 in association with a time code of the distributed video. The step S15 is performed by, for example, the received information management unit 21h.

Subsequently in step S16, it is determined whether a termination condition for ending the distribution of the video is satisfied. The termination condition is, for example, that the distribution ending time has come, that the supporter computer 40 has issued an instruction to end the distribution, or any other conditions. If the termination condition is not satisfied, the steps S11 to S15 of the process are repeatedly executed, and distribution of the video including the animation synchronized with the movements of the actor A1 and the actor A2 is continued. When it is determined that the termination condition is satisfied for the video, the distribution process of the video is ended.

In the flow shown in FIG. 11, it is possible to change the order of the steps. For example, although the step of receiving feedback information has been described as step S15, the feedback information may be received at any time when there is input from a viewing user while the video is being distributed. Concurrently with the steps S11 to S16, a process to store the evaluation information and the gift information in the storage 23 based on information transmitted from the client devices 10a to 10c to the server device 20 may be performed. The process of storing the evaluation information and the gift information in the storage 23 may be performed by the above-described received information management unit 21h. Further, a process of storing the actor information in the storage 23 may be performed concurrently with the steps S11 to S16. The process of storing the actor information in the storage 23 may be performed by, for example, the actor information management unit 21g.

Figure 12:
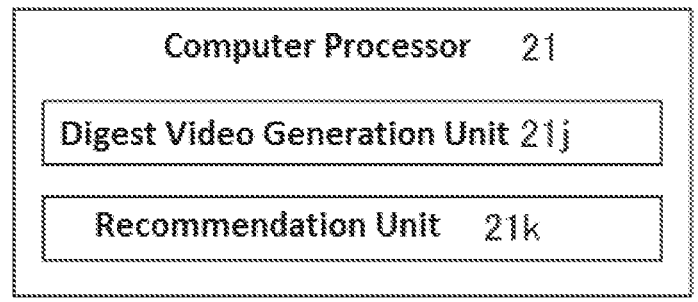
FIG. 12 is a block diagram illustrating a video distribution system in another embodiment.

Another embodiment of the invention will be described with reference to FIG. 12. FIG. 12 is a schematic diagram for explaining additional functions realized by the computer processor 21 in another embodiment of the invention. The embodiment shown in FIG. 12 is different from the above embodiment shown in FIG. 1 in that the computer processor 21 further functions as a digest video generation unit 21j and a recommendation unit 21k in addition to the functions shown in FIG. 1 by executing computer-readable instructions included in the video distribution program. Therefore, for the sake of brevity, additional functions implemented by the digest video generation unit 21j and the recommendation unit 21k in the embodiment of FIG. 12 will be mainly hereunder described, and other functions will be omitted.

The digest video generation unit 21j generates a digest video of a distributed video based on the nonverbal feedback information 23c2 on the distributed video and any other information as necessary. For example, the digest video generation unit 21j may identify a high-impact section that is assumed to receive intense reaction(s) from a viewing user(s) based on the nonverbal feedback information 23c2, and may generate a digest video to include the high-impact section. When acceleration of the viewing user is used as the nonverbal feedback information, it is possible to specify a section of the distribution video where the viewing user's acceleration is equal to or higher than a predetermined value as the high impact section. For example, in the whole distributed video, sections D1, D2, and D3 in which the acceleration values are greater than or equal to the threshold al in the graph 85 that shows the acceleration of the viewing user are selected as the digest video(s). The identified digest video can be distributed in response to a request from viewing users. In one embodiment, the client devices 10a to 10c may store at least one or more selected from the group consisting of the body motion data, the face motion data, and the voice data in the high impact section. When client devices 10a to 10c use the body motion data, the face motion data, and the voice data stored therein to render the digest video, it is possible to improve the rendering quality compared with the case where rendering is performed using the body motion data, the face motion data, and the voice data that are distributed in real time from the server device 20.

The server device is capable of distribute a plurality of videos in addition to the video containing the animation of the character object generated based on behavior of the actor A1 and the actor A2. Each of the plurality of videos is generated such that it includes an animation of a character object generated based on movements of an actor other than the actor A1 and the actor A2. For each of the plurality of videos, the server device 20 acquires actor information of the actor who performed for creating the video in the same manner as the actor information 23c5, and stores the acquired actor information in the storage 23. Further, the server device 20 acquires nonverbal feedback information for each video from viewing users who have viewed the plurality of videos, similarly to the nonverbal feedback information 23c2 information, and stores the acquired nonverbal feedback information in the storage 23. In one embodiment, the recommendation unit 21k recommends other video(s) or an actor(s) who has performed for creating other video(s) to a viewing user(s) who has viewed a prescribed video based on the actor information 23c5, the nonverbal feedback information 23c2 on each of the plurality of videos, and any other information as necessary stored in the storage. For example, for a viewing user who has viewed a video A, the recommendation unit 21k selects a video whose nonverbal feedback information similar to the nonverbal feedback information on the video A from the viewing user is stored, and recommends the selected video to the viewing user. The fact that the nonverbal feedback information of the two videos are similar to each other means that viewing users have made a similar nonverbal input to these two videos. Therefore, it is assumed that a user who has viewed one of the two videos with interest is likely to take an interest in the other of the two videos. For this reason, a video for which the nonverbal feedback information similar to the nonverbal feedback information from the viewing user about the video A is stored may be recommended to the viewing user who has viewed the video A. Thereby it is possible to recommend videos that are assumed to be interesting for the viewing user. In yet another embodiment, the recommendation unit 21k selects a video for which actor information similar to the actor information related to the actor who performed for creating the video A is stored, and recommends the video to the viewing user who has viewed the video A.

In one embodiment, the recommendation unit 21k may classify videos into two or more categories. The classification of videos may be performed based on the feedback information from viewing users regarding the videos. For example, the classification of the videos can be determined based on the type of gifts provided from viewing users to the videos and the timing when the gift is provided. Specifically, videos whose number of times that a gift displaying fireworks one minute before the end of the videos was gifted (purchased) exceeds a predetermined number (first threshold) are classified as type A, and videos whose number of times that a gift displaying a bouquet in one section of the videos was gifted exceeds a predetermined number (second threshold) are classified as type B. The recommendation unit 21k determines whether the viewing user who viewed the type A video likes the type A video based on the feedback information from the viewing user, and recommends another video according to the determination result. The recommendation unit 21k determines that the viewing user likes the type A video, for example, when positive evaluation information (Like) is provided from the viewing user, when it is detected that the viewing user laughed while watching the video based on the nonverbal feedback from the viewing user, or when a condition other than the above is satisfied. For viewing users who are judged to like such type A videos, videos belonging to the same type A may be recommended. Whereas for viewing users who are judged to dislike such type A videos, videos classified as a type other than type A are recommended. For viewers who are judged to dislike the type A videos, a negative evaluation may be given for the type A videos, and the negative evaluation may be used to generate a recommendation filter for selecting a video(s) to be recommended. In this manner, various recommendation filters can be generated.

A description will be now given of yet another embodiment of the invention. This embodiment of the invention relates to an improvement in interaction between a character displayed in a live-distributed video and a viewing user.

Conventionally, as described in Japanese Patent Application Publication No. 2013-021466, there is a known system that detects motions of viewing users who view live feed of a concert venue, and performs display that depends on the detected motions on a display at the concert venue. With this system, since an image of viewing users generated based on the motions of the viewing users outside the concert venue is displayed on the display at the concert venue, it is possible to provide an experience as if the viewing users outside the concert venue are participating in the concert.

There is also known a technique in which posting of comments on a distributed video is accepted and the posted comments are displayed together with poster's avatars. Japanese Patent Application Publication No. 2012-120098 describes a video distribution system that displays an avatar of a viewing user who has posted a comment and the comment in an area around the display area of a distributed video.

In the conventional video distribution systems, effects that reflect feedback from viewing users are displayed in a display area different from the display area that displays an actor's character. In other words, in the conventional video distribution systems, the effects based on feedback from viewing users are performed in such a way that the effect do not affect an animation of the character object generated based on the actor's behavior and the display area of the character object around the animation displayed area.

In a video distribution system that distributes a video including an animation of a character object generated based on actor's behavior to viewing users, there may be an effect that the actor who has received a comment from a viewing user responds to the comment. However, when the number of comments are increased, it is difficult for the actor to respond to each of the large number of comments. As described above, there is a limit to the attempts to activate the interaction with viewing users by the actor's action.

Conventionally, an effect based on feedback from viewing users is performed such that it does not interfere a character object of an actor as mentioned above. In the case where the effect causes a change to the character object of the actor, the change occurs through actor's conscious action. As described above, there is a limit to activate the interaction with viewing users by the actor's conscious action.

In a live performance in the real world, unconscious reaction such as joy occurs in an actor (performer) in response to feedback (for example, applause, cheering, booing in a live concert) from audience. Such an unconscious reaction by the actor is considered as an important element of the interaction between the actor and the viewing users. In conventional video distribution systems, display of the character object of the actor does not change unless the actor takes action consciously, and an unconscious reaction is not reflected to the displayed character object even when there is a high possibility that such an unconscious reaction occur in the actor in the real world.

Figure 13:
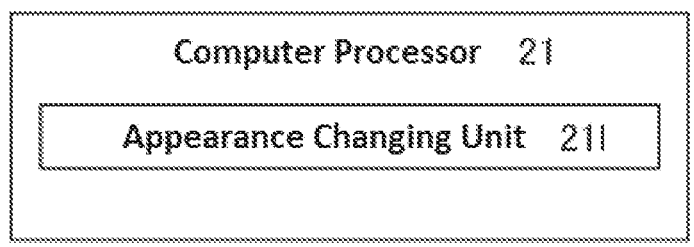
FIG. 13 is a block diagram illustrating a video distribution system in yet another embodiment.

In the embodiment described below with reference to FIG. 13, there is provided a video distribution system capable of changing an animation of a character object generated based on behavior of an actor without the actor's conscious action. FIG. 12 is a schematic diagram for explaining additional functions realized by the computer processor 21 in yet another embodiment of the invention. The embodiment shown in FIG. 13 is different from the above embodiment shown in FIG. 1 in that the computer processor 21 further functions as an appearance changing unit 21l in addition to the functions shown in FIG. 1 by executing computer-readable instructions included in the video distribution program. Therefore, for the sake of brevity, additional functions implemented by the appearance changing unit 21l in the embodiment of FIG. 13 will be mainly hereunder described, and other functions will be omitted.

The server device 20 also distributes a video including an animation of a character object generated based on behavior of an actor, and acquires feedback information from viewing users about the video in the embodiment of FIG. 13. The feedback information from the viewing users includes verbal feedback information and nonverbal feedback information as described above.

The appearance changing unit 21l changes the appearance of the character object included in the video based on the feedback information about the video from a viewing user who views the video. When acceleration of the viewing user (nonverbal feedback information) is used as the feedback information, the appearance changing unit 21l may change the appearance of the character object based on the magnitude of the viewing user's acceleration. For example, the appearance changing unit 21*l* may change the appearance of the character object such that the face of the character object is turned red prominently in accordance with the acceleration of the viewing user. Thereby, when it is deemed there is a big reaction from a viewing user based on the nonverbal feedback information, it is possible to change the appearance of the character object naturally in accordance with the reaction from the viewing user. When a change is made to the appearance of the character object, video frames including the character object whose appearance has been changed are distributed to the viewing user. Thereby, the viewing user is able to recognize the change in the appearance of the character object. For example, the viewing user will recognize that the change has occurred in the character object in response to the excitement of the viewing user, for example, by seeing that the face of the character object turned red. The appearance changing unit 21*l* is capable of changing the appearance of the character object in various ways other than the change in the redness of the character's face.

The appearance changing unit 21*l* may change the appearance of a character object based on information other than the nonverbal feedback information. For example, the appearance changing unit 21*l* may change the appearance of the character object based on the actor information instead of or in addition to the nonverbal feedback information. Specifically, based on the actor information, the appearance changing unit 21*l* may change the appearance of a character object that is generated based on movements of an actor when the cumulative total of the movements of the actor from the start of distribution exceeds a predetermined amount. For example, when the total of the movements of the actor from the start of distribution reaches a predetermined amount or more, the appearance of the character object generated based on the movements of the actor may be changed such that the character looks sweaty.

As described above, a video including an animation of a character object generated based on actor's behavior is distributed, and the appearance of the character object is changed based on feedback from a viewing user who views the video. In this way, the appearance of the character object of the actor can be changed based on the feedback from the viewing user even without conscious action by the actor. Therefore, it is possible to activate the interaction between the actor and the viewing user in the video including the animation of the character object of the actor without increasing the burden on the actor.

Next, yet another embodiment of the invention will be described. Still yet another embodiment of the invention relates to transmission of feedback from a viewing user to an actor.

In a conventional video distribution system, a comment in text format is received from a viewing user, and the received comment is displayed superimposed on a live-distributed video as mentioned above. In a video distribution system that distributes a video including an animation of a character object that is generated based on an actor's behavior, the actor can know viewers' reactions by reading comments posted in a text format.

However, when comments posted by viewing users are displayed such that they are superimposed on the video, the video originally displayed becomes difficult to view from the viewing users, which may deterioration of the viewing experience. In the case of live distribution, it may be also difficult for the actor to read comments posted while performing. Therefore, it is desired to deliver feedback from viewing users to the actor performing in a method other than posting comments.

Figure 14:
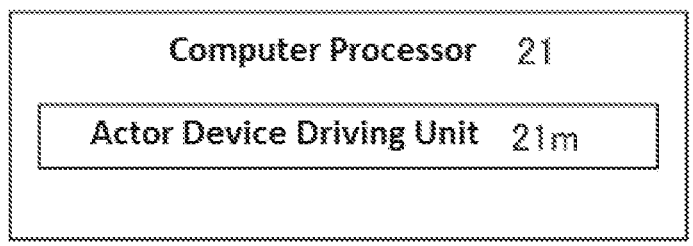
FIG. 14 is a block diagram illustrating a video distribution system in still yet another embodiment.

An embodiment described below with reference to FIG. 14 provides a video distribution system capable of delivering feedback from a viewing user to the actor A1 and/or the actor A2 by actuating the actuator 91*a* of the actor device 91 attached to the actor A1 and/or the actuator 92*a* of the actor device 92 attached to the actor A2 based on feedback information from the viewing user. FIG. 14 is a schematic diagram for explaining additional functions realized by the computer processor 21 in yet another embodiment of the invention. The embodiment shown in FIG. 14 is different from the above embodiment shown in FIG. 1 in that the computer processor 21 further functions as an actor device driving unit 21*m* in addition to the functions shown in FIG. 1 by executing computer-readable instructions included in the video distribution program. Therefore, for the sake of brevity, additional functions implemented by the actor device driving unit 21*m* in the embodiment of FIG. 14 will be mainly hereunder described, and other functions will be omitted.

The actor device driving unit 21*m* generates a driving signal for driving at least the actuator 91*a* of the actor device 91 or the actuator 92*a* of the actor device 92 based on feedback information about the video from a viewing user who views the video. When acceleration of the viewing user (nonverbal feedback information) is used as the feedback information, the actor device driving unit 21*m* may generate the driving signal depending on the magnitude of the viewing user's acceleration. For example, the actor device driving unit 21*m* may refer to the nonverbal feedback information 23*c*2 and may generate the driving signal when the acceleration of the viewing user reaches to or higher than a predetermined value (for example, a threshold value a1). The actor device driving unit 21*m* may change a voltage of the driving signal depending on the acceleration of the viewing user. Thus, the actuator 91*a* and the actuator 92*a* vibrate with different amplitudes depending on the voltage of the driving signal.

The generated driving signal is transmitted to the actor device 91 and/or the actor device 92. The actuator 91*a* is actuated based on the driving signal supplied to the actor device 91. The actuator 92*a* is actuated based on the driving signal supplied to the actor device 92. The actuators 91*a* and 92*a* may be configured to vibrate based on the driving signal.

According to the above embodiment, feedback information from the viewing user is conveyed to the actor A1 and the actor A2 by actuating the actuator 91*a* of the actor device 91 and the actuator 92*a* of the actor device 92. Thereby, the actor A1 and the actor A2 are able to perceive the feedback from the viewing user through the actuation of the actuator 91*a* and the actuator 92*a* respectively. For example, the actuator 91*a* and the actuator 92*a* are configured to vibrate based on the driving signal. In this case, feedback can be intuitively conveyed to the actor A1 and the actor A2 through the vibration of the actuator 91*a* and the actuator 92*a*.

Advantageous effects of the embodiments described above will be now described. In the above-described embodiment, the actor information representing behavior of an actor who performs for a video (for example, the actor A1 and the actor A2), and the nonverbal feedback information that represents nonverbal feedback from a viewing user and is detected by the user device (for example, the client devices 10*a* to 10*c* and the external devices 11*a* to 11*c*) are stored in association with a time code of the distributed video. The nonverbal feedback from the viewing user detected by the user device may be recorded at a time closer to the time when the viewing user intends to have performed an input than the text-format input where a delay is caused due to the viewing user's operation to input the text. By comparing the actor information and the nonverbal feedback information at a predetermined time, it is possible to correctly grasp to which action or behavior of the actor the nonverbal feedback of the viewing user is targeted. In this way, useful feedback is provided to a video creator such as the actor in the embodiment.

In the above embodiment, since the nonverbal feedback information includes acceleration of the user device held by the viewing user, it is possible to detect the nonverbal feedback information that represents the nonverbal feedback from the viewing user by only making the viewing user hold the user device while the viewing user is viewing the video.

In the above embodiment, the nonverbal feedback information includes the emotion information representing an emotion of the viewing user. Since it is not easy to control user's emotion by his/her intention, a natural (unconscious) reaction of the viewing user to the video is obtained compared to the verbal feedback information. Conscious feedback from a viewing user can be intentional. For example, intentional feedback may indicate a more positive or negative response than is actually felt by the viewing user for the video or actor. Thus, the intentional feedback may not correctly reflect the way the viewing user feels. Since the emotion information includes more unintentional and unconscious feedback of the viewing user, the emotion information can provide more useful feedback to the video creator.

In the above embodiment, the verbal feedback information representing verbal feedback from a viewing user is also stored in association with a time code of the video. Thereby, conscious verbal feedback information from the viewer user can be recorded in association with the actor information. In this way, more useful feedback is provided to a video creator such as an actor.

In the above embodiment, the evaluation information representing an evaluation result made by a viewing user is also stored in association with a time code of the video. In this case, the evaluation feedback from the viewing user can be recorded in association with the actor information so that the video creator is able to grasp what movement or behavior of the actor is highly appreciated by the viewing user.

In the above embodiment, the gift information representing a gift provided from a viewing user to the actor is also stored in association with a time code of the video. In this way, it is possible to grasp the behavior of the actor that leads to purchase of gifts by the viewing user or provision of gifts (gifting) from the viewing user.

In the above embodiment, the timeline information 80 including the actor information and the nonverbal feedback information is displayed on the display based on the time code. This allows visual understanding of the nonverbal feedback from the viewing user about actor's behavior.

In the above-described embodiment, the timeline information 80 is displayed on a display disposed at a position where the display is visible by the actor. This allows the actor to visually understand feedback from the viewing user about his/her performance in real time manner.

In the above embodiment, a digest video of the distributed video is generated based on the actor information and the nonverbal feedback information. Therefore, the digest video based on the nonverbal feedback from a viewing user(s) can be created. In the conventional digest video, sections or scenes considered to be highlighted from the viewpoint of the video creator are selected from the entire video, and the digest movie is created so as to include the selected sections. The digest video created in this manner does not necessarily include scenes desired by a viewing user(s) because the highlight scenes are selected by the subjective evaluation of the distributor or creator. Whereas in the above described embodiment, a digest video is created based on the nonverbal feedback information on which unconscious reactions of the viewing user(s) are reflected rather than the subjective view of the video creator. Therefore, it is possible to create a digest video including scenes that are desired by the viewing user or that attracts more attention of the viewing user.

In the above embodiment, based on the actor information and the nonverbal feedback information, another actor different from the actor who has performed for creating the animation of the character object of the distributed video is recommended to the viewing user who has viewed the video. In this way, it is possible to recommend an actor(s) to a viewing user based on the actor information and the non-verbal feedback information.

In the above described embodiment, a video including an animation of a character object generated based on behavior of an actor is distributed, and the appearance of the character object can be changed based on the feedback information from the viewing user who views the video. In this case, the appearance of the actor's character object can be changed based on the feedback information from the viewing user without actor's conscious action. Therefore, it is possible to activate the interaction between the actor and the viewing user in the video including the animation of the character object of the actor without increasing the burden on the actor.

In the above described embodiment, a video including an animation of a character object generated based on behavior of an actor is distributed, and a driving signal for actuating an actuator provided in an actor device used by the actor is generated based on the feedback information from a viewing user who views the video. In this way, it is possible to intuitively convey the feedback from the viewing user to the actor.

The client devices 10*a* to 10*c*, the server device 20, and other devices included in the video distribution system 1 may also execute functions other than those explicitly described in this specification.

In one embodiment, each of the client devices 10*a* to 10*c* may receive health information related to the health of a viewing user who views a video. The health information may include information about a biological sensor that detects biological information of the viewing user, a feeling that the viewing user has while watching the video and is inputted by the viewing user, symptoms experienced during the viewing of the video (e.g., headache, palpitation), and medicine that the viewing user takes (for example, the name of the medicine, the time of dosing, the dose of the medicine), and any other information related to the health of the viewing user. The health information of the viewing user who views the video may be stored in the client devices 10*a* to 10*c* in association with a time code of the video. This health information may be transmitted from the client devices 10*a* to 10*c* to the server device 20. The health information may be stored for each viewing user in the storage 23 of the server device 20. The health information may include a part of the verbal feedback information or the nonverbal feedback information. For example, as mentioned above, the health information may include the nonverbal feedback information.

The computer processor 21 may generate feedback for a viewing user(s) based on recorded health information of the viewing user(s), and may transmit the generated feedback to the corresponding client devices 10*a* to 10*c* of the viewing user(s). For example, when it is determined that a viewing user has a tendency to develop a headache in about an hour from the start of viewing a video based on the recorded health information of the viewing user, the computer processor 21 may generate feedback that prompts the viewing user to take a break after about 50 minutes from the start of viewing the video. As another example, when it is determined that the time when a viewing user should take a medicine is approaching based on recorded health information of the viewing user, the computer processor 21 may generate feedback that prompts the viewing user to take the medicine.

Based on the recorded health information of the viewing user, the computer processor 21 may generate medical guidance information that can be used to determine a therapeutic strategy and treatment, and the generated medical guidance information may be provided to a doctor, a pharmacist, or any other healthcare professionals. For example, the computer processor 21 may provide biological information of a viewing user who is viewing a video to a doctor, a pharmacist, or any other healthcare professionals. A doctor, a pharmacist, or any other healthcare professionals can refer to the medical guidance information when deciding a therapeutic strategy and treatment.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

1 video distribution system

What is claimed is:

1. A video distribution system, comprising:
    one or more computer processors, wherein the one or more computer processors execute computer-readable instructions to:
        distribute, to a viewing user, a video that includes an animation of a character object generated based on one or more motions of an actor;
        obtain, from one or more sensors, actor information representing the one or more motions of the actor and first time codes indicating times when the one or more motions of the actor were detected by at least one of the one or more sensors;
        obtain, from one or more user devices associated with the viewing user, nonverbal feedback information representing nonverbal feedback about the video detected by the one or more user devices and including second time codes indicating times when the nonverbal feedback information was accepted by at least one of the one or more user devices;
        store (i) the actor information representing the one or more motions of the actor and (ii) the nonverbal feedback information representing the nonverbal feedback about the video, wherein the viewing user differs from the actor; and
        generate timeline information comprising the actor information and the nonverbal feedback information synchronized based on the first time codes and the second time codes, wherein feedback regarding a performance of the actor is obtained based on the timeline information.

2. The video distribution system of claim 1, wherein the nonverbal feedback information includes an acceleration of the one or more user devices while held by the viewing user.

3. The video distribution system of claim 1, wherein the nonverbal feedback information includes biological information of the viewing user.

4. The video distribution system of claim 1, wherein the nonverbal feedback information includes emotion information representing an emotion of the viewing user.

5. The video distribution system of claim 1, wherein the one or more computer processors further execute the computer-readable instructions to:
    obtain, from the one or more user devices associated with the viewing user, verbal feedback information representing verbal feedback about the video detected by the one or more user devices and including third time codes indicating times when the verbal feedback information was accepted by at least one of the one or more user devices; and
    store (iii) the verbal feedback information representing verbal feedback about the video, wherein the timeline information further comprises the verbal feedback information.

6. The video distribution system of claim 5, wherein the verbal feedback is determined based on text input or speech input.

7. The video distribution system of claim 1, wherein the one or more computer processors further execute the computer-readable instructions to:
    obtain, from the one or more user devices associated with the viewing user, evaluation information representing an evaluation made by the viewing user and including third time codes indicating times when the evaluation is accepted by at least one of the one or more user devices; and
    store (iii) the evaluation information representing the evaluation made by the viewing user, wherein the timeline information further comprises the evaluation information.

8. The video distribution system of claim 1, wherein the one or more computer processors further execute the computer-readable instructions to:
    obtain, from the one or more user devices associated with the viewing user, gift purchase information related to a gift purchased by the viewing user, gifting information related to a gift provided from the viewing user to the actor, or the gift purchase information and the gifting information, wherein the gift purchase information, the gifting information, or the gift purchase information and the gifting information include third time codes indicating times when the gift purchase information, the gifting information, or the gift purchase information and the gifting information are acquired by at least one of the one or more user devices; and
    store (iii) the gift purchase information, the gifting information, or the gift purchase information and the gifting information, wherein the timeline information further comprises the gift purchase information, the gifting information, or the gift purchase information and the gifting information.

9. The video distribution system of claim 1, wherein the one or more computer processors, when executing the computer-readable instructions, are further configured to:

display the timeline information comprising the nonverbal feedback information and the actor information in time series.

10. The video distribution system of claim 1, wherein the actor information and the nonverbal feedback information are displayed on a display disposed at a position where the actor is able to see the display.

11. The video distribution system of claim 1, wherein the one or more computer processors s, when executing the computer-readable instructions, are further configured to:
generate a digest video of the video based on the nonverbal feedback information.

12. The video distribution system of claim 1, wherein the one or more computer processors, when executing the computer-readable instructions, are further configured to:
recommend another actor different from the actor to the viewing user based on the actor information and the nonverbal feedback information, wherein the feedback comprises a recommendation for the other actor different from the actor.

13. A method of distributing a video performed by executing computer readable instructions by one or more computer processor, comprising:
distributing, to a viewing user, a video that includes an animation of a character object generated based on one or more motions of an actor;
obtaining, from one or more sensors, actor information representing the one or more motions for the actor and first time codes indicating times when the one or more motions of the actor were detected by at least one of the one or more sensors;
obtaining, from one or more user devices associated with the viewing user, nonverbal feedback information representing nonverbal feedback about the video detected by the one or more user devices and including second time codes indicating times when the nonverbal feedback information was accepted by at least one of the one or more user devices;
storing (i) the actor information representing the one or more motions of the actor and (ii) the nonverbal feedback information representing the nonverbal feedback about the video, wherein the viewing user differs from the actor; and
generating timeline information comprising the actor information and the nonverbal feedback information synchronized based on the first time codes and the second time codes, wherein feedback regarding a performance of the actor is obtained based on the timeline information.

14. A computer-readable tangible non-transitory storage medium storing a program executed by one or more computer processors, wherein the program, when executed by the one or more computer processors, effectuate operations comprising:
distributing, to a viewing user, a video that includes an animation of a character object generated based on one or more motions of an actor;
obtaining, from one or more sensors, actor information representing the one or more motions for the actor and first time codes indicating times when the one or more motions of the actor were detected by at least one of the one or more sensors;
obtaining, from one or more user devices associated with the viewing user, nonverbal feedback information representing nonverbal feedback about the video detected by the one or more user devices and including second time codes indicating times when the nonverbal feedback information was accepted by at least one of the one or more user devices;
storing (i) the actor information representing the one or more motions of the actor and (ii) the nonverbal feedback information representing the nonverbal feedback about the video, wherein the viewing user differs from the actor; and
generating timeline information comprising the actor information and the nonverbal feedback information synchronized based on the first time codes and the second time codes, wherein feedback regarding a performance of the actor is obtained based on the timeline information.

15. The video distribution system of claim 1, wherein the nonverbal feedback information detected by the one or more user devices associated with the viewing user is obtained prior to the nonverbal feedback information being stored.

16. The video distribution system of claim 1, wherein the one or more computer processors, when executing the computer-readable instructions, are further configured to:
select one or more other videos to recommend to the viewing user based on at least one of the actor information or the nonverbal feedback information; and
provide a recommendation of the one or more other videos to the viewing user.

17. The video distribution system of claim 16, wherein the one or more other videos are selected based on a similarity between the nonverbal feedback information of the distributed video and nonverbal feedback information of each of the one or more other videos.

18. The video distribution system of claim 1, wherein the one or more user devices do not include the one or more sensors.

* * * * *